United States Patent
Yamamoto et al.

(10) Patent No.: US 10,228,595 B2
(45) Date of Patent: Mar. 12, 2019

(54) DISPLAY DEVICE WITH LAYERED WIRING STRUCTURE FOR EXTERNAL CONNECTION

(71) Applicant: SHARP KABUSHIKI KAISHA, Sakai, Osaka (JP)

(72) Inventors: Etsuo Yamamoto, Sakai (JP); Hiroyuki Ohkawa, Sakai (JP); Shige Furuta, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 192 days.

(21) Appl. No.: 15/520,265

(22) PCT Filed: Nov. 13, 2015

(86) PCT No.: PCT/JP2015/081924
§ 371 (c)(1),
(2) Date: Apr. 19, 2017

(87) PCT Pub. No.: WO2016/080290
PCT Pub. Date: May 26, 2016

(65) Prior Publication Data
US 2017/0336688 A1 Nov. 23, 2017

(30) Foreign Application Priority Data
Nov. 21, 2014 (JP) .................. 2014-236424

(51) Int. Cl.
*G02F 1/1362* (2006.01)
*G09G 3/36* (2006.01)
(Continued)

(52) U.S. Cl.
CPC ...... *G02F 1/136286* (2013.01); *G02F 1/1345* (2013.01); *G09G 3/3614* (2013.01);
(Continued)

(58) Field of Classification Search
CPC ............. G02F 1/136286; G02F 1/1345; G02F 1/133305; G02F 2001/13629;
(Continued)

(56) References Cited

U.S. PATENT DOCUMENTS

| 6,886,914 B2 * | 5/2005 | Hiramoto ............. B41J 2/14274 174/117 F |
| 2008/0185167 A1 * | 8/2008 | Lee ...................... H01B 7/0823 174/117 F |

(Continued)

FOREIGN PATENT DOCUMENTS

JP 05-019282 A 1/1993

*Primary Examiner* — Darlene M Ritchie
(74) *Attorney, Agent, or Firm* — Keating & Bennett, LLP

(57) ABSTRACT

In a display device having a layered wiring structure of P layers, and employing a Q-column reversal driving method in which a polarity of a video signal is reversed every Q source bus lines, the plurality of source bus lines are wired to the plurality of layers such that taking source bus lines of a number equal to a double of a least common multiple of P and Q as one group, the number of source bus lines to which positive video signals are applied matches the number of source bus lines to which negative video signals are applied in each of the layers in each of horizontal scanning periods.

14 Claims, 34 Drawing Sheets

(51) Int. Cl.
    *G02F 1/1345* (2006.01)
    *G09G 3/00* (2006.01)
(52) U.S. Cl.
    CPC . *G09G 3/3688* (2013.01); *G02F 2001/13629* (2013.01); *G09G 3/006* (2013.01); *G09G 2300/0426* (2013.01); *G09G 2310/0202* (2013.01); *G09G 2330/12* (2013.01)
(58) Field of Classification Search
    CPC .... G09G 3/3614; G09G 3/006; G09G 3/3688; G09G 3/3266; G09G 3/3275; G09G 3/3655; G09G 3/3674; G09G 2330/12; G09G 2300/0426; G09G 2310/0202; G09G 2310/0218; G09G 2310/027; G09G 2310/0281; H05K 1/147; H05K 3/361; G06F 3/0416; G06F 3/0412; G06F 1/183; G06F 1/1601; G06F 2203/04103; H01L 51/0097; H01L 27/124; H01L 27/3276; H01L 2224/48247; H01L 2224/49105; H01L 2224/49171; H01L 2225/06506; H01L 2225/0651; H01L 2225/1052; H01L 41/083; H01L 2924/19107; H04N 2213/001
    See application file for complete search history.

(56) References Cited

U.S. PATENT DOCUMENTS

| | | |
|---|---|---|
| 2009/0096975 A1 | 4/2009 | Kwon et al. |
| 2015/0228706 A1* | 8/2015 | Lee .................. G02F 1/1368 257/88 |
| 2016/0026053 A1 | 1/2016 | Kawamura |
| 2017/0148770 A1* | 5/2017 | Ishino .................. H02M 7/48 |

* cited by examiner

Fig.15

| SECOND LAYER | SL2 (−) | SL3 (+) | SL6 (−) | SL7 (+) | SL10 (−) | SL11 (+) |
| --- | --- | --- | --- | --- | --- | --- |
| FIRST LAYER | SL1 (−) | SL4 (+) | SL5 (−) | SL8 (+) | SL9 (−) | SL12 (+) |

Fig.16

| SECOND LAYER | SL2 (−) | SL4 (+) | SL6 (−) | SL8 (+) | SL10 (−) | SL12 (+) |
| --- | --- | --- | --- | --- | --- | --- |
| FIRST LAYER | SL1 (−) | SL3 (+) | SL5 (−) | SL7 (+) | SL9 (−) | SL11 (+) |

Fig.17

| SECOND LAYER | SL2 (−) | SL3 (−) | SL6 (+) | SL7 (−) | SL10 (+) | SL11 (+) |
| --- | --- | --- | --- | --- | --- | --- |
| FIRST LAYER | SL1 (−) | SL4 (+) | SL5 (+) | SL8 (−) | SL9 (−) | SL12 (+) |

Fig.18

| THIRD LAYER | SL3 (−) | SL6 (+) | SL9 (−) | SL12 (+) |
|---|---|---|---|---|
| SECOND LAYER | SL2 (+) | SL5 (−) | SL8 (+) | SL11 (−) |
| FIRST LAYER | SL1 (−) | SL4 (+) | SL7 (−) | SL10 (+) |

Fig.19

| THIRD LAYER | SL3 (−) | SL4 (+) | SL9 (−) | SL10 (+) |
|---|---|---|---|---|
| SECOND LAYER | SL2 (+) | SL5 (−) | SL8 (+) | SL11 (−) |
| FIRST LAYER | SL1 (−) | SL6 (+) | SL7 (−) | SL12 (+) |

Fig.20

| THIRD LAYER | SL2 (+) | SL5 (−) | SL8 (+) | SL11 (−) |
|---|---|---|---|---|
| SECOND LAYER | SL3 (−) | SL6 (+) | SL9 (−) | SL12 (+) |
| FIRST LAYER | SL1 (−) | SL4 (+) | SL7 (−) | SL10 (+) |

Fig.21

| | | | | |
|---|---|---|---|---|
| THIRD LAYER | SL3 (+) | SL6 (−) | SL9 (−) | SL12 (+) |
| SECOND LAYER | SL2 (−) | SL5 (−) | SL8 (+) | SL11 (+) |
| FIRST LAYER | SL1 (−) | SL4 (+) | SL7 (+) | SL10 (−) |

Fig.22

| | | | | |
|---|---|---|---|---|
| THIRD LAYER | SL3 (+) | SL4 (+) | SL9 (−) | SL10 (−) |
| SECOND LAYER | SL2 (−) | SL5 (−) | SL8 (+) | SL11 (+) |
| FIRST LAYER | SL1 (−) | SL6 (−) | SL7 (+) | SL12 (+) |

Fig.23

| | | | | |
|---|---|---|---|---|
| THIRD LAYER | SL2 (−) | SL5 (−) | SL8 (+) | SL11 (+) |
| SECOND LAYER | SL3 (+) | SL6 (−) | SL9 (−) | SL12 (+) |
| FIRST LAYER | SL1 (−) | SL4 (+) | SL7 (+) | SL10 (−) |

Fig.24

| THIRD LAYER | SL3 (−) | SL6 (+) | SL9 (−) | SL12 (+) |
|---|---|---|---|---|
| SECOND LAYER | SL2 (−) | SL5 (+) | SL8 (−) | SL11 (+) |
| FIRST LAYER | SL1 (−) | SL4 (+) | SL7 (−) | SL10 (+) |

Fig.25

| THIRD LAYER | SL3 (−) | SL4 (+) | SL9 (−) | SL10 (+) |
|---|---|---|---|---|
| SECOND LAYER | SL2 (−) | SL5 (+) | SL8 (−) | SL11 (+) |
| FIRST LAYER | SL1 (−) | SL6 (+) | SL7 (−) | SL12 (+) |

Fig.26

| THIRD LAYER | SL2 (−) | SL5 (+) | SL8 (−) | SL11 (+) |
|---|---|---|---|---|
| SECOND LAYER | SL3 (−) | SL6 (+) | SL9 (−) | SL12 (+) |
| FIRST LAYER | SL1 (−) | SL4 (+) | SL7 (−) | SL10 (+) |

Fig.27

| FOURTH LAYER | SL4 (+) | SL5 (−) | SL12 (+) | SL13 (−) |
| THIRD LAYER | SL3 (−) | SL6 (+) | SL11 (−) | SL14 (+) |
| SECOND LAYER | SL2 (+) | SL7 (−) | SL10 (+) | SL15 (−) |
| FIRST LAYER | SL1 (−) | SL8 (+) | SL9 (−) | SL16 (+) |

Fig.28

| FOURTH LAYER | SL2 (+) | SL7 (−) | SL10 (+) | SL15 (−) |
| THIRD LAYER | SL3 (−) | SL6 (+) | SL11 (−) | SL14 (+) |
| SECOND LAYER | SL4 (+) | SL5 (−) | SL12 (+) | SL13 (−) |
| FIRST LAYER | SL1 (−) | SL8 (+) | SL9 (−) | SL16 (+) |

Fig.29

| FOURTH LAYER | SL4 (+) | SL5 (−) | SL12 (+) | SL13 (−) |
| THIRD LAYER | SL1 (−) | SL8 (+) | SL9 (−) | SL16 (+) |
| SECOND LAYER | SL2 (+) | SL7 (−) | SL10 (+) | SL15 (−) |
| FIRST LAYER | SL3 (−) | SL6 (+) | SL11 (−) | SL14 (+) |

Fig.30

| | | | | |
|---|---|---|---|---|
| FOURTH LAYER | SL4 (+) | SL5 (−) | SL12 (+) | SL13 (−) |
| THIRD LAYER | SL3 (+) | SL6 (−) | SL11 (+) | SL14 (−) |
| SECOND LAYER | SL2 (−) | SL7 (+) | SL10 (−) | SL15 (+) |
| FIRST LAYER | SL1 (−) | SL8 (+) | SL9 (−) | SL16 (+) |

Fig.31

| | | | | |
|---|---|---|---|---|
| FOURTH LAYER | SL2 (−) | SL7 (+) | SL10 (−) | SL15 (+) |
| THIRD LAYER | SL3 (+) | SL6 (−) | SL11 (+) | SL14 (−) |
| SECOND LAYER | SL4 (+) | SL5 (−) | SL12 (+) | SL13 (−) |
| FIRST LAYER | SL1 (−) | SL8 (+) | SL9 (−) | SL16 (+) |

Fig.32

| | | | | |
|---|---|---|---|---|
| FOURTH LAYER | SL4 (+) | SL5 (−) | SL12 (+) | SL13 (−) |
| THIRD LAYER | SL1 (−) | SL8 (+) | SL9 (−) | SL16 (+) |
| SECOND LAYER | SL2 (−) | SL7 (+) | SL10 (−) | SL15 (+) |
| FIRST LAYER | SL3 (+) | SL6 (−) | SL11 (+) | SL14 (−) |

Fig.33

| | | | | | | |
|---|---|---|---|---|---|---|
| FOURTH LAYER | SL4 (+) | SL5 (+) | SL12 (+) | SL13 (−) | SL20 (−) | SL21 (−) |
| THIRD LAYER | SL3 (−) | SL6 (+) | SL11 (+) | SL14 (−) | SL19 (−) | SL22 (+) |
| SECOND LAYER | SL2 (−) | SL7 (−) | SL10 (+) | SL15 (−) | SL18 (+) | SL23 (+) |
| FIRST LAYER | SL1 (−) | SL8 (−) | SL9 (−) | SL16 (+) | SL17 (+) | SL24 (+) |

Fig.34

| | | | | | | |
|---|---|---|---|---|---|---|
| FOURTH LAYER | SL2 (−) | SL7 (−) | SL10 (+) | SL15 (−) | SL18 (+) | SL23 (+) |
| THIRD LAYER | SL3 (−) | SL6 (+) | SL11 (+) | SL14 (−) | SL19 (−) | SL22 (+) |
| SECOND LAYER | SL4 (+) | SL5 (+) | SL12 (+) | SL13 (−) | SL20 (−) | SL21 (−) |
| FIRST LAYER | SL1 (−) | SL8 (−) | SL9 (−) | SL16 (+) | SL17 (+) | SL24 (+) |

Fig.35

| | | | | | | |
|---|---|---|---|---|---|---|
| FOURTH LAYER | SL4 (+) | SL5 (+) | SL12 (+) | SL13 (−) | SL20 (−) | SL21 (−) |
| THIRD LAYER | SL1 (−) | SL8 (−) | SL9 (−) | SL16 (+) | SL17 (+) | SL24 (+) |
| SECOND LAYER | SL2 (−) | SL7 (−) | SL10 (+) | SL15 (−) | SL18 (+) | SL23 (+) |
| FIRST LAYER | SL3 (−) | SL6 (+) | SL11 (+) | SL14 (−) | SL19 (−) | SL22 (+) |

Fig.36

| FOURTH LAYER | SL4 (−) | SL5 (+) | SL12 (−) | SL13 (+) |
| --- | --- | --- | --- | --- |
| THIRD LAYER | SL3 (−) | SL6 (+) | SL11 (−) | SL14 (+) |
| SECOND LAYER | SL2 (−) | SL7 (+) | SL10 (−) | SL15 (+) |
| FIRST LAYER | SL1 (−) | SL8 (+) | SL9 (−) | SL16 (+) |

Fig.37

| FOURTH LAYER | SL2 (−) | SL7 (+) | SL10 (−) | SL15 (+) |
| --- | --- | --- | --- | --- |
| THIRD LAYER | SL3 (−) | SL6 (+) | SL11 (−) | SL14 (+) |
| SECOND LAYER | SL4 (−) | SL5 (+) | SL12 (−) | SL13 (+) |
| FIRST LAYER | SL1 (−) | SL8 (+) | SL9 (−) | SL16 (+) |

Fig.38

| FOURTH LAYER | SL4 (−) | SL5 (+) | SL12 (−) | SL13 (+) |
| --- | --- | --- | --- | --- |
| THIRD LAYER | SL1 (−) | SL8 (+) | SL9 (−) | SL16 (+) |
| SECOND LAYER | SL2 (−) | SL7 (+) | SL10 (−) | SL15 (+) |
| FIRST LAYER | SL3 (−) | SL6 (+) | SL11 (−) | SL14 (+) |

Fig.40

| SECOND LAYER | SL1 | SL4 | SL5 | SL8 | SL9 | SL12 |
|---|---|---|---|---|---|---|
| FIRST LAYER | SL2 | SL3 | SL6 | SL7 | SL10 | SL11 |

Fig.41

| SECOND LAYER | SL1 (−) | SL4 (+) | SL5 (−) | SL8 (+) | SL9 (−) | SL12 (+) |
|---|---|---|---|---|---|---|
| FIRST LAYER | SL2 (+) | SL3 (−) | SL6 (+) | SL7 (−) | SL10 (+) | SL11 (−) |

Fig.42

| SECOND LAYER | SL1 (+) | SL4 (−) | SL5 (+) | SL8 (−) | SL9 (+) | SL12 (−) |
|---|---|---|---|---|---|---|
| FIRST LAYER | SL2 (−) | SL3 (+) | SL6 (−) | SL7 (+) | SL10 (−) | SL11 (+) |

| | | | | | | |
|---|---|---|---|---|---|---|
| SECOND LAYER | SL1 (−) | SL3 (−) | SL5 (−) | SL7 (−) | SL9 (−) | SL11 (−) |
| FIRST LAYER | SL2 (+) | SL4 (+) | SL6 (+) | SL8 (+) | SL10 (+) | SL12 (+) |

DISPLAY DEVICE WITH LAYERED WIRING STRUCTURE FOR EXTERNAL CONNECTION

TECHNICAL FIELD

The present invention relates to a display device, and more specifically to a display device having a layered wiring structure in a region between external connecting terminals on a panel substrate and an active area (display region).

BACKGROUND ART

A display device such as a liquid crystal display device, is provided with a large number of signal lines within a display region that is called as an active area. These signal lines are connected to external connecting terminals (terminals for receiving video signals output from a source driver IC mounted on the panel substrate, for example) disposed on a panel substrate. In the meantime, as to wiring between the active area and the external connecting terminals, as illustrated in FIG. 53, a wiring structure in a fan shape on a plane surface of the panel substrate is often employed.

In recent years, demands for downsizing of display devices have become increased. However, employment of a wiring structure as illustrated in FIG. 53 tends to increase a size of a picture-frame. In particular, when the number of signal lines provided within the active area increases due to increased resolution, a size of a picture-frame increases remarkably. An increase in the size of a picture-frame as described above makes downsizing of display devices difficult.

Thus, it is proposed to employ a layered structure having two or more layers for wiring between external connecting terminals and an active area. Here, the following description is given focusing on source bus lines (video signal lines) for transmitting video signals, among signal lines provided in the active area. FIG. 54 is a plan view illustrating one example of a conventional layered wiring structure. FIG. 55 is a diagram for detailed description of the wiring structure shown in FIG. 54. FIG. 54 shows source bus lines SL1 to SL12 of a first column to a twelfth column among a plurality of (e.g., 960) source bus lines disposed extending from external connecting terminals to the active area. It should be noted that, in the following description, the source bus lines are denoted by a reference character SL when the source bus lines do not need to be distinguished from each other.

The wiring structure illustrated in FIG. 54 and FIG. 55 is configured by wiring lines (first-layer wiring lines) K1 provided in a first layer (a lower layer in this case) and wiring lines (second-layer wiring lines) K2 provided in a second layer (an upper layer in this case). One (the source bus line SL2 in FIG. 55) of two adjacent source bus lines is configured only by a first-layer wiring line K1. The other (the source bus line SL1 in FIG. 55) of the two adjacent source bus lines is configured by the first-layer wiring line K1 and a second-layer wiring line K2. The first-layer wiring lines K1 and the second-layer wiring lines K2 are connected by contacts CT, respectively. Within a region denoted by a reference character 92 in FIG. 55, the first-layer wiring line K1 and the second-layer wiring line K2 are arranged so as to be overlapped with each other in a vertical direction (up-down direction). Here, an insulating layer (not shown) is disposed between the first-layer wiring line K1 and the second-layer wiring line K2.

By arranging the plurality of source bus lines SL so as to be overlapped with each other in the vertical direction as described above, it is possible to reduce the size of a picture-frame as compared to the case in which a wiring structure illustrated in FIG. 53 is employed. A display device having a layered wiring structure in this manner is disclosed, for example, in Japanese Laid-Open Patent Publication No. 05-19282.

PRIOR ART DOCUMENT

Patent Document

[Patent Document 1] Japanese Laid-Open Patent Publication No. 05-19282

SUMMARY OF THE INVENTION

Problems to be Solved by the Invention

However, when a wiring structure as illustrated in FIG. 54 is employed, there is a case in which display quality deteriorates due to bias in polarities of video signals in each layer. This will be described in detail below. Here, it is assumed that a one-column reversal driving method is employed as a polarity reversal method. Focusing on 12 source bus lines SL1 to SL12 illustrated in FIG. 54, a polarity of video signals applied to source bus lines SL of odd-numbered columns is opposite to a polarity of video signals applied to source bus lines SL of even-numbered columns, in each of horizontal scanning periods. In FIG. 54, polarities of video signals applied to the respective source bus lines SL focusing on one horizontal scanning period are indicated above the corresponding source bus lines SL (a portion indicated by a reference character 91) (this also applies to FIG. 1, FIG. 39, FIG. 47, FIG. 57, and FIG. 59). In this example, the polarity of the video signals applied to the source bus lines SL of odd-numbered columns is negative, and the polarity of the video signals applied to the source bus lines SL of even-numbered columns is positive. Here, a cross-sectional view (schematic view) taken along line B-B in FIG. 54 is as shown in FIG. 56. In FIG. 56, signs indicating polarities of video signals applied to the respective source bus lines SL in one horizontal scanning period are added following the reference characters for the corresponding source bus lines SL (this also applies to FIG. 9, FIG. 10, FIG. 15 to FIG. 38, FIG. 41, and FIG. 42).

It can be seen from FIG. 56 that in one horizontal scanning period, the polarities of the video signals applied to the respective source bus lines SL provided in the first layer are all positive, and the polarities of the video signals applied to the respective source bus lines SL provided in the second layer are all negative. As described above, the polarities of the video signals are positively biased regarding the first layer, and the polarities of the video signals are negatively biased regarding the second layer. It should be noted that, after 1 frame, the polarities of the video signals are negatively biased regarding the first layer, and the polarities of the video signals are positively biased regarding the second layer. In the meantime, in the layered wiring structure, in general, wiring resistances and capacitances are different between layers. Therefore, when the polarities of the video signals are biased in each layer as described above, waveforms of the video signals are rounded in different manners between the first layer and the second layer. As a result, display quality deteriorates.

As described above, according to the conventional layered wiring structure, since the polarities of the video signals are biased in each layer, display quality deteriorates due to difference in wiring resistance and capacitance between the layers.

Thus, an object of the present invention is to suppress deterioration of display quality due to difference in wiring resistance and capacitance between the layers in a display device having a layered wiring structure.

Means for Solving the Problems

A first aspect of the present invention is directed to a display device including:

a panel substrate including a layered region and a display region, the layered region having a layered wiring structure of a plurality of layers;

a plurality of video signal lines provided on the panel substrate; and a plurality of external connecting terminals, provided on the panel substrate, for receiving supply of video signals to be applied to the plurality of video signal lines, wherein the plurality of video signal lines are provided so as to extend from the plurality of external connecting terminals into the display region via the layered region, and the plurality of video signal lines are wired in the plurality of layers such that a number of video signal lines to which positive video signals are applied is substantially equal to a number of video signal lines to which negative video signals are applied in each of the layers in the layered region in each of horizontal scanning periods.

According to a second aspect of the present invention, in the first aspect of the present invention, the layered region has a layered wiring structure of P layers (where P is an integer equal to or greater than 2), a Q-column reversal driving method in which a polarity of a video signal is reversed every Q video signal lines is employed (where Q is a natural number), and taking video signal lines of a number equal to a double of a least common multiple of P and Q as one group, the number of video signal lines to which the positive video signals are applied matches the number of video signal lines to which the negative video signals are applied in each of the layers in the layered region in each of horizontal scanning periods.

According to a third aspect of the present invention, in the second aspect of the present invention, the display device further includes a potential supply line configured to be able to supply a predetermined potential to each of the video signal lines.

According to a fourth aspect of the present invention, in the third aspect of the present invention, in the layered region, two video signal lines adjacent in a vertical direction are a combination of a video signal line of an odd-numbered column and a video signal line of an even-numbered column, and two video signal lines adjacent in a horizontal direction are a combination of a video signal line of an odd-numbered column and a video signal line of an even-numbered column.

According to a fifth aspect of the present invention, in the fourth aspect of the present invention, the potential supply line includes a first-type potential supply line connected to the video signal line of the odd-numbered column and a second-type potential supply line connected to the video signal line of the even-numbered column.

According to a sixth aspect of the present invention, in the fifth aspect of the present invention, the potential supply line includes a single first-type potential supply line and a single second-type potential supply line.

According to a seventh aspect of the present invention, in the fifth aspect of the present invention, potentials of different values are respectively supplied to the first-type potential supply line and the second-type potential supply line.

According to an eighth aspect of the present invention, in the fourth aspect of the present invention, the layered region has a layered wiring structure of two layers.

According to a ninth aspect of the present invention, in the third aspect of the present invention, a predetermined reference potential is supplied to the plurality of video signal lines via the potential supply line.

According to a tenth aspect of the present invention, in the first aspect of the present invention, the panel substrate includes, as the layered region, a first layered region and a second layered region between the plurality of external connecting terminals and the display region, and each of the plurality of video signal lines is wired in different layers in the first layered region and the second layered region.

According to an eleventh aspect of the present invention, in the first aspect of the present invention, the layered region has a layered wiring structure of two layers including a first layer and a second layer, and where n is a natural number, video signal lines of (4n−3)th columns and video signal lines of 4n-th columns are wired in the first layer, and video signal lines of (4n−2)th columns and video signal lines of (4n−1)th columns are wired in the second layer.

According to a twelfth aspect of the present invention, in the eleventh aspect of the present invention, the panel substrate includes, as the layered region, a first layered region and a second layered region between the plurality of external connecting terminals and the display region, video signal lines wired in the first layer in the first layered region are wired in the second layer in the second layered region, and video signal lines wired in the second layer in the first layered region are wired in the first layer in the second layered region.

According to a thirteenth aspect of the present invention, in the first aspect of the present invention, the plurality of video signal lines and a different line intersect in a region in which the plurality of video signal lines are wired in the same layer.

According to a fourteenth aspect of the present invention, in the first aspect of the present invention, in the layered region, wiring widths of the plurality of video signal lines are different between the layers.

Effects of the Invention

According to the first aspect of the present invention, in the display device having the layered wiring structure, in each layer of the layered region, the number of the video signal lines where the polarity of video signals is positive is equal to the number of the video signal lines where the polarity of video signals is negative. With this, the polarities of the video signals are balanced in each layer of the layered region. Therefore, even when wiring resistances and capacitances are different between the layers, the waveforms of the video signals are rounded in the same manner in all layers. Since occurrence of a difference in rounding of the waveforms of the video signals between the layers is suppressed, deterioration of the display quality may be suppressed. As described above, in the display device having a layered wiring structure, deterioration of display quality due to difference in wiring resistance and capacitance between the layers is suppressed.

According to the second aspect of the present invention, the polarities of the video signals are balanced in each layer of the layered region every unit of video signal lines as few as possible. With this, occurrence of bias in polarities of the video signals in each layer is effectively suppressed, and deterioration of display quality is effectively suppressed.

According to the third aspect of the present invention, for example, by supplying potentials different to each other respectively to two adjacent video signal lines using potential supply lines, it is possible to detect a leakage defect between the two video signal lines. Further, for example, by supplying a reference potential (ground potential) to all of the video signal lines using the potential supply lines when a device is turned off or terminated abnormally, it is possible to eliminate residual electric charges on the video signal lines.

According to the fourth aspect of the present invention, by supplying potentials of different values to the video signal lines of the odd-numbered columns and the video signal lines of the even-numbered columns using the potential supply lines, the potentials of different values are supplied to any two adjacent video signal lines in the non-layered region, the potentials of different values are supplied to any two video signal lines adjacent in the vertical direction in the layered region, and the potentials of different values are supplied to any two video signal lines adjacent in the horizontal direction in the layered region. In this manner, in order to detect leakage between any two adjacent video signal lines, supplying potentials of different values to a video signal line of an odd-numbered column and a video signal line of an even-numbered column is sufficient. Therefore, it is possible to set a minimum number of the potential supply lines serving as testing lines to two. With this, since a picture-frame size can be reduced, it is possible to downsize the display device.

According to the fifth aspect of the present invention, by supplying different potentials to a first-type potential supply line and a second-type potential supply line, it is possible to achieve the same effect as that of the fourth aspect of the present invention.

According to the sixth aspect of the present invention, the display device is provided with only two potential supply lines, it is possible to reduce a size of a picture-frame reliably as compared to a similar conventional display device.

According to the seventh aspect of the present invention, it is possible to ensure the same effect as that of the fourth aspect of the present invention.

According to the eighth aspect of the present invention, in a display device having a layered wiring structure of two layers, it is possible to achieve the same effect as that of the fourth aspect of the present invention.

According to the ninth aspect of the present invention, since electric charges on the video signal lines can be eliminated when a device is turned off or terminated abnormally, for example, it is possible to suppress deterioration of display quality due to presence of a residual electric charge.

According to the tenth aspect of the present invention, a plurality of video signal lines are wired in each of layers such that the number of the video signal lines where the polarity of video signals is positive is equal to the number of the video signal lines where the polarity of video signals is negative in each layer of the layered region, and each of the video signal lines is wired in different layers in two layered regions. Therefore, waveforms of the video signals are rounded in the same manner as a whole both in video signal lines to which positive video signals are to be applied and in video signal lines to which negative video signals are to be applied. With this, deterioration of display quality is effectively suppressed.

According to the eleventh aspect of the present invention, the polarities of the video signals are balanced in each layer of the layered region every four video signal lines. With this, occurrence of bias in polarities of the video signals in each layer is effectively suppressed, and deterioration of display quality is effectively suppressed.

According to the twelfth aspect of the present invention, it is possible to achieve the same effect as that of the tenth aspect of the present invention and the eleventh aspect of the present invention.

According to the thirteenth aspect of the present invention, bias in magnitude of the wiring resistance does not occur in the portion where the video signal lines intersect with the different lines. Therefore, waveforms of the video signals are rounded in the same manner in all of the video signal lines. Accordingly, deterioration of display quality is more effectively suppressed.

According to the fourteenth aspect of the present invention, even when a shot of the wiring goes out of alignment in the manufacturing process, it is possible to suppress occurrence of a local difference in the wiring capacitance due to misalignment in the wiring. Therefore, deterioration of display quality is more effectively suppressed.

BRIEF DESCRIPTION OF THE DRAWINGS

FIG. 15 is a schematic cross-sectional view illustrating one example of the wiring structure where the number of layers for wiring is two and a two-column reversal driving method is employed according to a variant of the first embodiment.

FIG. 16 is a schematic cross-sectional view illustrating one example of the wiring structure where the number of layers for wiring is two and the two-column reversal driving method is employed according to a variant of the first embodiment.

FIG. 17 is a schematic cross-sectional view illustrating one example of the wiring structure where the number of layers for wiring is two and a three-column reversal driving method is employed according to a variant of the first embodiment.

FIG. 18 is a schematic cross-sectional view illustrating one example of the wiring structure where the number of layers for wiring is three and a one-column reversal driving method is employed according to a variant of the first embodiment.

FIG. 19 is a schematic cross-sectional view illustrating one example of the wiring structure where the number of layers for wiring is three and the one-column reversal driving method is employed according to a variant of the first embodiment.

FIG. 20 is a schematic cross-sectional view illustrating one example of the wiring structure where the number of layers for wiring is three and the one-column reversal driving method is employed according to a variant of the first embodiment.

FIG. 21 is a schematic cross-sectional view illustrating one example of the wiring structure where the number of layers for wiring is three and the two-column reversal driving method is employed according to a variant of the first embodiment.

FIG. 22 is a schematic cross-sectional view illustrating one example of the wiring structure where the number of layers for wiring is three and the two-column reversal driving method is employed according to a variant of the first embodiment.

FIG. 23 is a schematic cross-sectional view illustrating one example of the wiring structure where the number of layers for wiring is three and the two-column reversal driving method is employed according to a variant of the first embodiment.

FIG. 24 is a schematic cross-sectional view illustrating one example of the wiring structure where the number of layers for wiring is three and the three-column reversal driving method is employed according to a variant of the first embodiment.

FIG. 25 is a schematic cross-sectional view illustrating one example of the wiring structure where the number of layers for wiring is three and the three-column reversal driving method is employed according to a variant of the first embodiment.

FIG. 26 is a schematic cross-sectional view illustrating one example of the wiring structure where the number of layers for wiring is three and the three-column reversal driving method is employed according to a variant of the first embodiment.

FIG. 27 is a schematic cross-sectional view illustrating one example of the wiring structure where the number of layers for wiring is four and the one-column reversal driving method is employed according to a variant of the first embodiment.

FIG. 28 is a schematic cross-sectional view illustrating one example of the wiring structure where the number of layers for wiring is four and the one-column reversal driving method is employed according to a variant of the first embodiment.

FIG. 29 is a schematic cross-sectional view illustrating one example of the wiring structure where the number of layers for wiring is four and the one-column reversal driving method is employed according to a variant of the first embodiment.

FIG. 30 is a schematic cross-sectional view illustrating one example of the wiring structure where the number of layers for wiring is four and the two-column reversal driving method is employed according to a variant of the first embodiment.

FIG. 31 is a schematic cross-sectional view illustrating one example of the wiring structure where the number of layers for wiring is four and the two-column reversal driving method is employed according to a variant of the first embodiment.

FIG. 32 is a schematic cross-sectional view illustrating one example of the wiring structure where the number of layers for wiring is four and the two-column reversal driving method is employed according to a variant of the first embodiment.

FIG. 33 is a schematic cross-sectional view illustrating one example of the wiring structure where the number of layers for wiring is four and the three-column reversal driving method is employed according to a variant of the first embodiment.

FIG. 34 is a schematic cross-sectional view illustrating one example of the wiring structure where the number of layers for wiring is four and the three-column reversal driving method is employed according to a variant of the first embodiment.

FIG. 35 is a schematic cross-sectional view illustrating one example of the wiring structure where the number of layers for wiring is four and the three-column reversal driving method is employed according to a variant of the first embodiment.

FIG. 36 is a schematic cross-sectional view illustrating one example of the wiring structure where the number of layers for wiring is four and a four-column reversal driving method is employed according to a variant of the first embodiment.

FIG. 37 is a schematic cross-sectional view illustrating one example of the wiring structure where the number of layers for wiring is four and the four-column reversal driving method is employed according to a variant of the first embodiment.

FIG. 38 is a schematic cross-sectional view illustrating one example of the wiring structure where the number of layers for wiring is four and the four-column reversal driving method is employed according to a variant of the first embodiment.

FIG. 40 is a cross-sectional view (schematic view) taken along line A2-A2 in FIG. 39.

FIG. 41 is a diagram showing polarities of video signals applied to source bus lines of corresponding layers in a second layered region in one frame (frame A) according to the second embodiment.

FIG. 42 is a diagram showing polarities of video signals applied to the source bus lines of the corresponding layers in a second layered region in a frame (frame B) following the frame A according to the second embodiment.

MODES FOR CARRYING OUT THE INVENTION

Hereinafter, embodiments according to the present invention will be described with reference to the accompanying drawings.

1. First Embodiment

<1.1 Entire Configuration and Schematic Operation>

Figure 2:
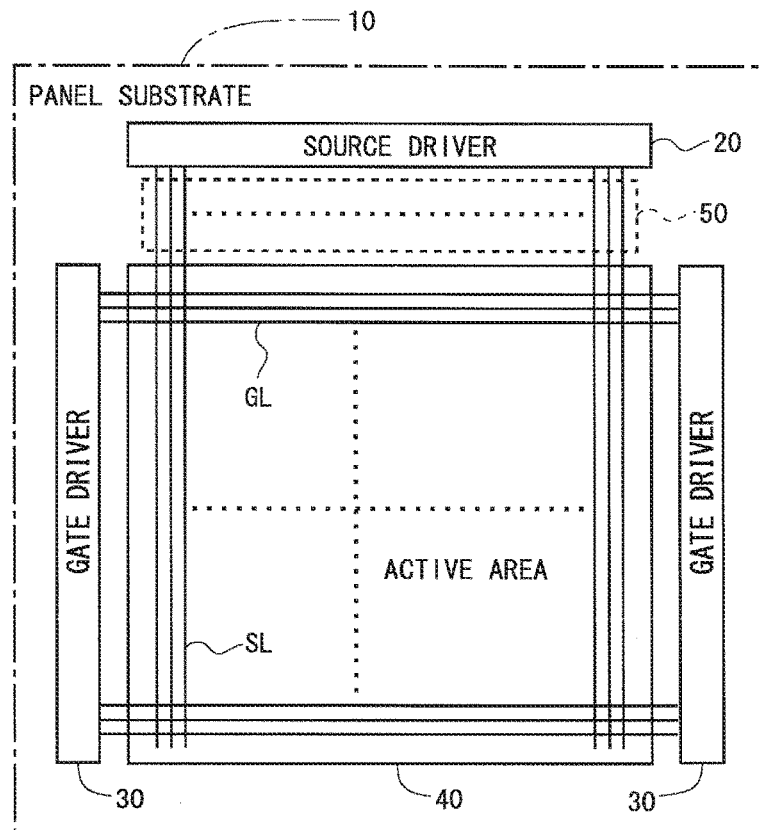
FIG. 2 is a block diagram illustrating an entire configuration of the liquid crystal display device according to the first embodiment.
Figure 3:
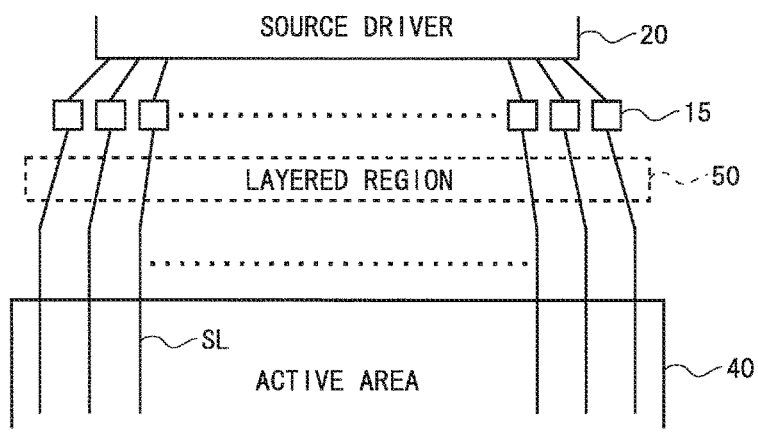
FIG. 3 is a diagram for illustration of a position where the layered region is provided according to the first embodiment.

FIG. 2 is a block diagram illustrating an entire configuration of an active matrix-type liquid crystal display device according to a first embodiment of the present invention. As illustrated in FIG. 2, this liquid crystal display device is provided with a source driver 20, a gate driver 30, and an active area (display region) 40. The active area 40 and the gate driver 30 are provided on a panel substrate 10. Here, the panel substrate 10 in this embodiment is a glass substrate. The source driver 20 is mounted on the panel substrate 10 in a COG (Chip On Glass) manner, for example. Specifically, the source driver 20 in this embodiment is an IC chip. On the panel substrate 10, external connecting terminals for receiving video signals output from the source driver 20 which is an IC chip are provided. Here, a region indicated by a reference character 50 in FIG. 2 is a region having a layered wiring structure (hereinafter referred to as a "layered region"). As illustrated in FIG. 3, the layered region 50 is provided between external connecting terminals 15 and the active area 40. The wiring structure in the layered region 50 will be described in detail later.

In the active area 40, a plurality of source bus lines SL and a plurality of gate bus lines GL are provided. A pixel formation portion constituting a pixel (not shown in FIG. 2) is provided correspondingly at each of intersections between the plurality of source bus lines SL and the plurality of gate bus lines GL. Specifically, the active area 40 is provided with a plurality of pixel formation portions.

Figure 4:
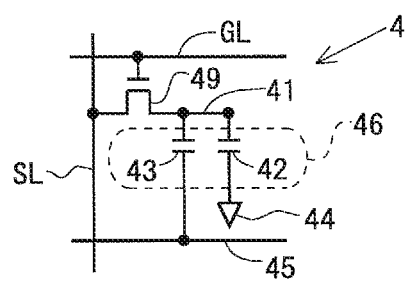
FIG. 4 is a diagram illustrating a configuration of a pixel formation portion according to the first embodiment.

FIG. 4 is a diagram illustrating a configuration of a pixel formation portion 4. As illustrated in FIG. 4, the pixel formation portion 4 includes a TFT (Thin-Film Transistor) 49 as a switching element in which a gate bus line GL passing a corresponding intersection is connected to a gate terminal and a source bus line SL passing the same intersection is connected to a source terminal, a pixel electrode 41 connected to a drain terminal of the TFT 49, a common electrode 44 and an auxiliary capacitance electrode 45 commonly provided for the plurality of pixel formation portions 4, a liquid crystal capacitance 42 constituted by the pixel electrode 41 and the common electrode 44, and an auxiliary capacitance 43 constituted by the pixel electrode 41 and the auxiliary capacitance electrode 45. The liquid crystal capacitance 42 and the auxiliary capacitance 43 constitute a pixel capacitance 46.

In the meantime, as the TFT 49 in the pixel formation portion 4, an oxide TFT (a thin-film transistor in which an oxide semiconductor is used for a channel layer) may be employed, for example. Examples of the oxide TFT include TFTs containing InGaZnO (Indium Gallium Zinc Oxide). The oxide TFT is characterized by high mobility and low leakage current. Therefore, employing an oxide TFT provides effects of downsizing and reduced power consumption. However, the present invention is not limited to such an example. For example, it is possible to employ a TFT in which amorphous silicon is used for a channel layer.

It should be noted that it is herein assumed that a display controller for controlling an operation of the source driver 20 and the gate driver 30 is provided outside the panel substrate 10 (e.g., on a flexible substrate connected to the panel substrate 10). A digital video signal and a source control signal are transmitted to the source driver 20 from the display controller, and a gate control signal is transmitted to the gate driver 30 from the display controller. The source control signal includes, for example, a source start pulse signal, a source clock signal, and a latch strobe signal. The gate control signal includes, for example, a gate start pulse signal and a gate clock signal.

The source driver 20 receives the digital video signal and the source control signal transmitted from the display controller, and applies a video signal for driving to each of the source bus lines SL. At this time, the source driver 20 sequentially holds digital video signals indicating voltages to be applied to the respective source bus lines SL at timing at which a pulse of the source clock signal is generated. Then, at timing at which a pulse of the latch strobe signal is generated, the held digital video signals are converted into analog voltages. The converted analog voltages are applied as the video signals for driving to all the source bus lines SL at once. The gate driver 30 repeats application of an active scanning signal to each of the gate bus lines GL with one vertical scanning period taken as a cycle, based on the gate control signal transmitted from the display controller.

As described above, by applying a video signal for driving to each of the source bus lines SL and applying a scanning signal to each of the gate bus lines GL, a desired image is displayed on the active area 40 serving as a display region.

<1.2 Polarity Reversal Method>

Figure 5:
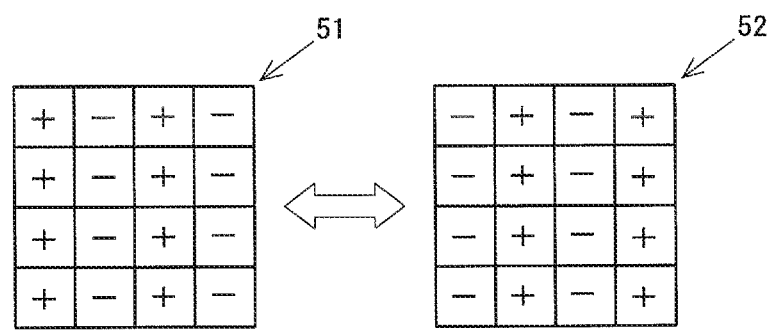
FIG. 5 is a diagram for illustration of a one-column reversal driving method.
Figure 6:
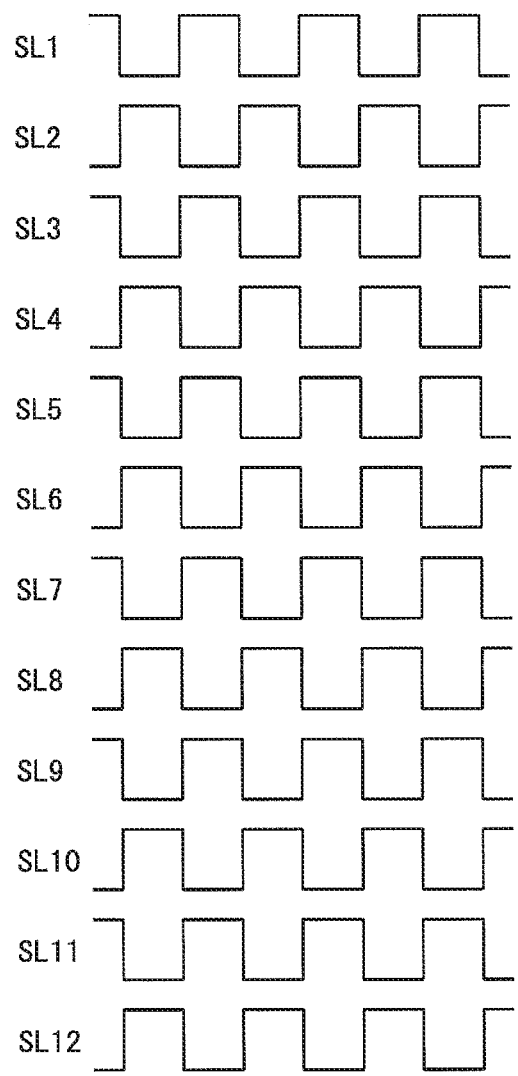
FIG. 6 is a waveform diagram of video signals for illustration of the one-column reversal driving method.

Next, a polarity reversal method according to this embodiment will be described. The liquid crystal display device according to this embodiment employs a one-column reversal driving method as the polarity reversal method. The one-column reversal driving method is a driving method in which a polarity of a pixel voltage is reversed every one frame, and in which polarities of pixels adjacent to each other in a lateral (horizontal) direction are reversed in each frame. When such a one-column reversal driving method is employed, a polarity pattern indicated by a reference character 51 in FIG. 5 and a polarity pattern indicated by a reference character 52 in FIG. 5 appear alternately every other frame. Further, waveforms of the video signals applied to the source bus lines SL are as shown in FIG. 6. FIG. 6 shows waveforms of the video signals for the source bus lines SL1 to SL12 of a first column to a twelfth column. Here, regarding FIG. 6, amplitude of the actual video signal varies depending on display gradation of each pixel. As can be seen from FIG. 5 and FIG. 6, the polarity of the video signal changes in the same manner for all of odd-numbered source bus lines SL, and the polarity of the video signal changes in the same manner for all of even-numbered source bus lines SL. Moreover, the polarity of the video signal of the odd-numbered source bus lines SL is always opposite to the polarity of the video signal of the even-numbered source bus lines SL. In this embodiment, the one-column reversal driving method as described above is employed.

Figure 7:
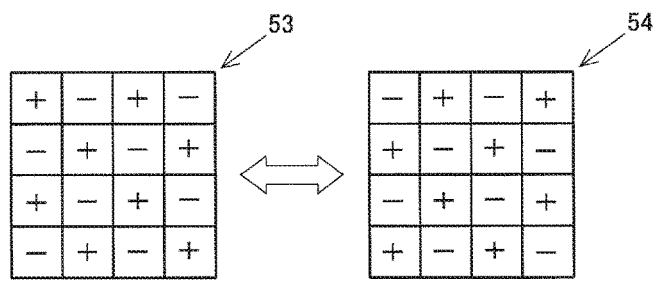
FIG. 7 is a diagram for illustration of a dot-reversal driving method.

It should be noted that the present invention may also be applied to a case in which a dot-reversal driving method is employed as the polarity reversal method. The dot-reversal driving method is a driving method in which a polarity of a pixel voltage is reversed every one frame period, and in which polarities of pixels adjacent to each other in the lateral (horizontal) direction and polarities of pixels adjacent to each other in a longitudinal (vertical) direction are reversed in each frame. When the dot-reversal driving method is employed, a polarity pattern indicated by a reference character 53 in FIG. 7 and a polarity pattern indicated by a reference character 54 in FIG. 7 appear alternately every other frame. The present invention may be applied to the case in which the dot-reversal driving method is employed, similarly to the case in which the one-column reversal driving method is employed.

<1.3 Wiring Structure Between External Connecting Terminal and Active Area>

Figure 1:
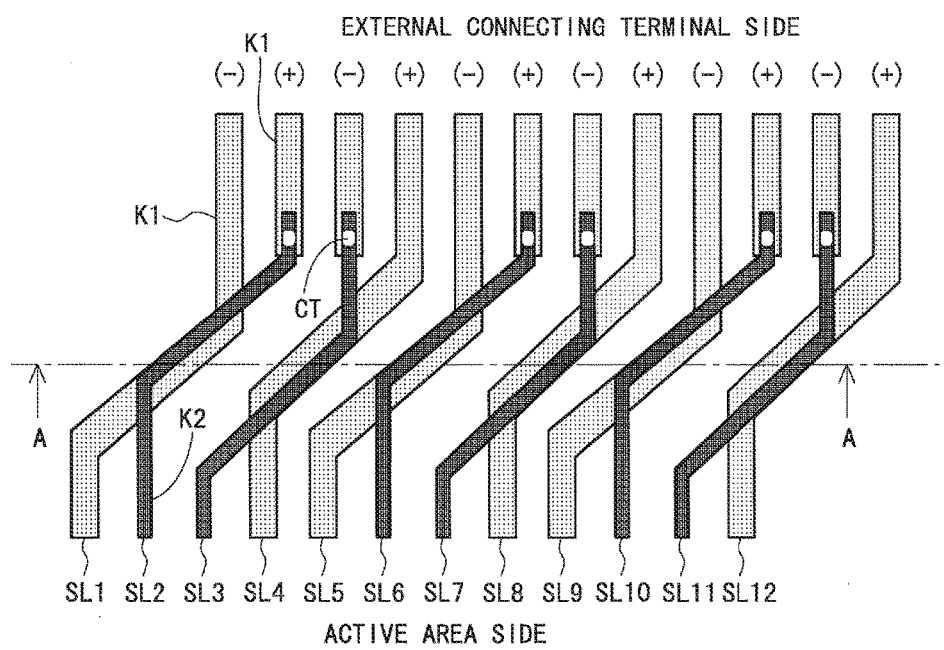
FIG. 1 is a plan view illustrating a wiring structure of a layered region in a liquid crystal display device according to a first embodiment of the present invention.

Referring to FIG. 1, a description will be given of a wiring structure between the external connecting terminals (terminals for receiving video signals output from the source driver 20 which is an IC chip) 15 provided on the panel substrate 10 and the active area 40. FIG. 1 is a plan view illustrating the wiring structure of the layered region 50 according to this embodiment. The wiring structure is configured by first-layer wiring lines K1 provided in a first layer (a lower layer in this case) and second-layer wiring lines K2 provided in a second layer (an upper layer in this case). The first-layer wiring lines K1 and the second-layer wiring lines K2 are connected by contacts CT, respectively.

Here, the source bus lines SL1 to SL4 of the first column to the fourth column are focused on in FIG. 1. The source bus line SL1 of the first column and the source bus line SL4 of the fourth column are configured only by the first-layer wiring lines K1, the source bus line SL2 of the second column and the source bus line SL3 of the third column are configured by the first-layer wiring lines K1 and the second-layer wiring lines K2. For the source bus lines SL of the fifth column and after, this configuration is repeatedly provided every four columns. Specifically, where n is a natural number, each of source bus lines SL of (4n−3)th columns and source bus lines SL of 4n-th columns is configured only by the first-layer wiring line K1, and each of source bus lines SL of (4n−2)th columns and source bus lines SL of (4n−1)th columns is configured by the first-layer wiring line K1 and the second-layer wiring line K2.

Figure 8:
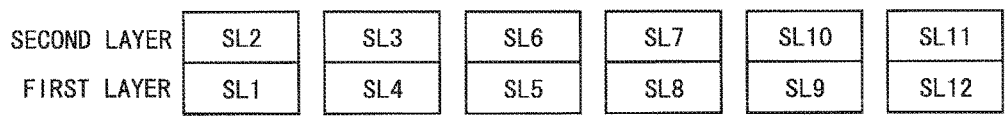
FIG. 8 is a cross-sectional view (schematic view) taken along line A-A in FIG. 1.

FIG. 8 is a cross-sectional view (schematic view) taken along line A-A in FIG. 1. As can be seen from FIG. 8, on the line A-A in FIG. 1, the source bus lines SL of the (4n−3)th columns and the source bus lines SL of the 4n-th columns are provided in the first layer, and the source bus lines SL of the (4n−2)th columns and the source bus lines SL of the (4n−1)th columns are provided in the second layer. Hereinafter, the description focuses on polarities of video signals in each of the layers in thus layered region.

<1.4 Balance of Polarities of Video Signals in Each Layer>

Figure 9:
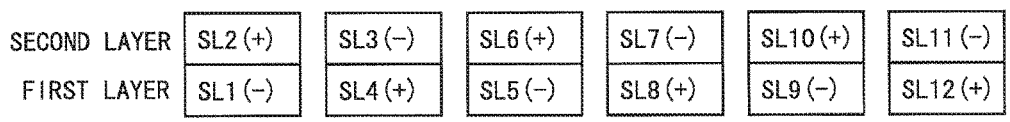
FIG. 9 is a diagram showing polarities of video signals respectively applied to source bus lines of corresponding layers in one frame (frame A) according to the first embodiment.
Figure 10:
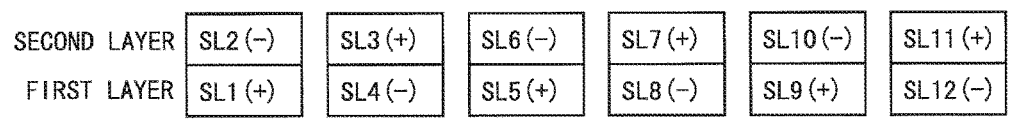
FIG. 10 is a diagram showing polarities of video signals respectively applied to the source bus lines of the corresponding layers in a frame (frame B) following the frame A according to the first embodiment.

FIG. 9 is a diagram showing polarities of video signals respectively applied to the source bus lines SL of corresponding layers in one frame ("frame A" for convenience sake). Further, FIG. 10 is a diagram showing polarities of video signals respectively applied to the source bus lines SL of the corresponding layers in a frame ("frame B" for convenience sake) following the frame A. In the frame A, in the first layer, the number of the source bus lines SL where the polarity of video signals is positive is equal to the number of the source bus lines SL where the polarity of video signals is negative. Moreover, in the frame A, also in the second layer, the number of the source bus lines SL where the polarity of video signals is positive is equal to the number of the source bus lines SL where the polarity of video signals is negative. In the frame B, in the first layer, the number of the source bus lines SL where the polarity of video signals is positive is equal to the number of the source bus lines SL where the polarity of video signals is negative. In the frame B, also in the second layer, the number of the source bus lines SL where the polarity of video signals is positive is equal to the number of the source bus lines SL where the polarity of video signals is negative.

As described above, during a period in which the liquid crystal display device operates, in each layer of the layered wiring structure, the number of the source bus lines SL to which positive video signals are applied is equal to the number of the source bus lines SL to which negative video signals are applied. In other words, the plurality of source bus lines SL are wired in the plurality of layers such that the number of the source bus lines SL to which positive video signals are applied is equal to the number of the source bus lines SL to which negative video signals are applied in each layer of the layered region 50 in a horizontal scanning period in each frame. From the above, the polarities of the video signals are balanced in each layer of the layered region 50.

<1.5 Regarding Wiring Widths of First-Layer Wiring Lines and Second-Layer Wiring Lines>

Figure 11:
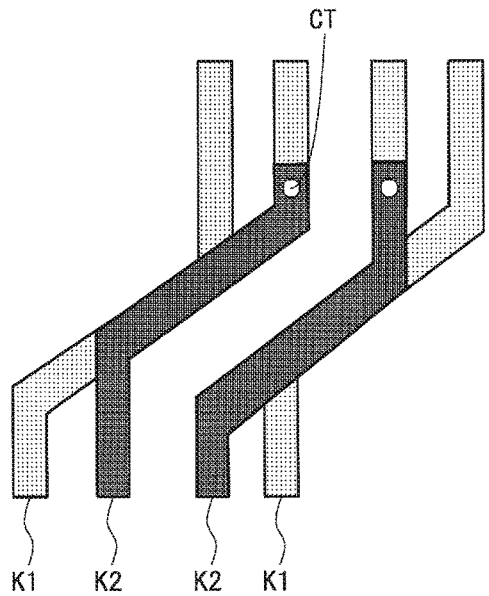
FIG. 11 is a diagram for illustration of a wiring width of first-layer wiring line and second-layer wiring line according to the first embodiment.
Figure 12:
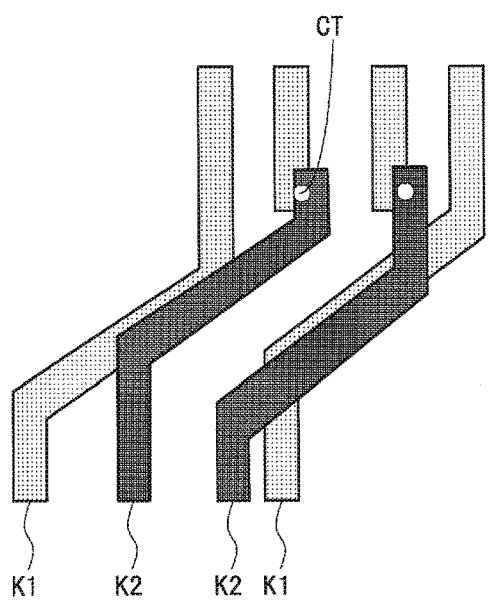
FIG. 12 is a diagram for illustration of the wiring width of the first-layer wiring line and the second-layer wiring line according to the first embodiment.

Here, wiring widths of the first-layer wiring lines K1 and the second-layer wiring lines K2 in the layered region 50 will be described. In a case where a wiring width of the first-layer wiring lines K1 and a wiring width of the second-layer wiring lines K2 are made equal as illustrated in FIG. 11 in the layered region 50, when a shot (exposure shot) of the wiring goes out of alignment in a manufacturing process, a local difference in a wiring capacitance occurs due to misalignment in the wiring as illustrated in FIG. 12. As a result, waveforms of the video signals are rounded in different manners between the source bus lines SL, and thus display quality deteriorates.

Figure 13:
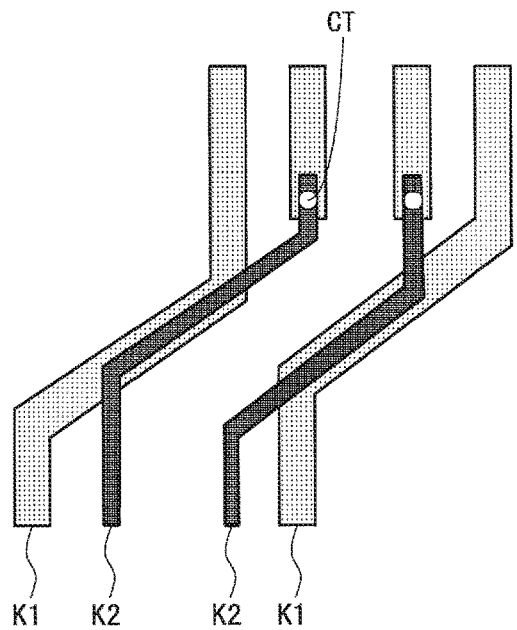
FIG. 13 is a diagram for illustration of the wiring width of the first-layer wiring line and the second-layer wiring line according to the first embodiment.
Figure 14:
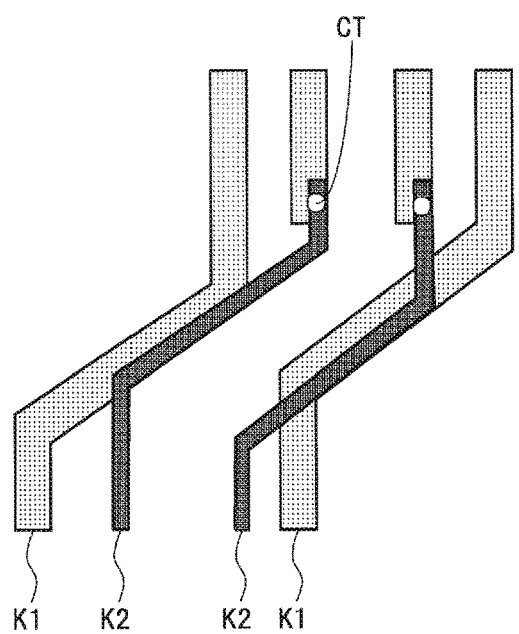
FIG. 14 is a diagram for illustration of the wiring width of the first-layer wiring line and the second-layer wiring line according to the first embodiment.

Therefore, as illustrated in FIG. 13, it is desirable to make the wiring width of the first-layer wiring lines K1 different from the wiring width of the second-layer wiring lines K2 in the layered region 50. In the example shown in FIG. 13, the wiring width of the first-layer wiring lines (wiring in the lower layer) K1 is greater than the wiring width of the second-layer wiring lines (wiring in the upper layer) K2. By employment of such a configuration, even when a shot of the wiring goes out of alignment in the manufacturing process, it is possible to suppress occurrence of a local difference in the wiring capacitance due to misalignment in the wiring (see FIG. 14). However, the present invention does not intend to eliminate a configuration in which the wiring widths of the source bus lines SL are made equal between the plurality of layers.

<1.6 Effects>

According to this embodiment, in the liquid crystal display device having a layered wiring structure in a region between the external connecting terminals 15 on the panel substrate 10 and the active area 40, the number of the source bus lines SL where the polarity of video signals is positive is equal to the number of the source bus lines SL where the polarity of video signals is negative in each layer. With this, the polarities of the video signals are balanced in each layer of the layered region 50. Therefore, even when wiring resistances and capacitances are different between the layers, the waveforms of the video signals are rounded in the same manner in all layers. Since occurrence of a difference in rounding of the waveforms of the video signals between the layers is thus suppressed, deterioration of the display quality is suppressed. As described above, according to this embodiment, in the liquid crystal display device having a layered wiring structure, deterioration of display quality due to difference in wiring resistance and capacitance between the layers is suppressed. Further, by making the wiring width of the source bus lines SL different between the layers in the layered region 50, it is possible to suppress deterioration of display quality more effectively.

<1.7 Variants>

Although the case in which the one-column reversal driving method is employed is taken as an example in the first embodiment, the present invention is not limited to such an example. The present invention may also be applied to a case in which an m-column reversal driving method (e.g., a 2-column reversal driving method or a 3-column reversal driving method) is employed, where m is an integer equal to or greater than 2. Further, although the number of the layers of wiring is two in the first embodiment, the present invention is not limited to such an example. The present invention may also be applied to a case in which the number of the layers of wiring is three or more. Therefore, different variants will be described in the following.

<1.7.1 Two Layers>

<1.7.1.1 Two-Layer and Two-Column Reversal Driving Method>

FIG. 15 is a schematic cross-sectional view illustrating one example of the wiring structure where the number of layers for wiring is two and a two-column reversal driving method is employed. In FIG. 15, a portion where the source bus lines SL1 to SL4 of the first column to the fourth column are provided is focused on. In both of the first layer and the second layer, the number of the source bus lines SL where the polarity of video signals is positive is one, and the number of the source bus lines SL where the polarity of video signals is negative is one. In this manner, taking the four source bus lines SL as one group, the number of the columns whose polarity is positive and the number of the columns whose polarity is negative is equal in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 16 is a schematic cross-sectional view illustrating one example (different from the example of FIG. 15) of the wiring structure where the number of layers for wiring is two and the two-column reversal driving method is employed. Similarly to the example shown in FIG. 15, taking the four source bus lines SL as one group, the number of the columns whose polarity is positive and the number of the columns whose polarity is negative is equal in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.7.1.2 Two-Layer and Three-Column Reversal Driving Method>

FIG. 17 is a schematic cross-sectional view illustrating one example of the wiring structure where the number of layers for wiring is two and a three-column reversal driving method is employed. In FIG. 17, a portion where the source bus lines SL1 to SL12 of the first column to the twelfth column are provided is focused on. In both of the first layer and the second layer, the number of the source bus lines SL where the polarity of video signals is positive is three, and the number of the source bus lines SL where the polarity of video signals is negative is three. In this manner, taking the twelve source bus lines SL as one group, the number of the columns whose polarity is positive and the number of the columns whose polarity is negative is equal in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.7.2 Three Layers>

<1.7.2.1 Three-Layer and One-Column Reversal Driving Method>

FIG. 18 is a schematic cross-sectional view illustrating one example of the wiring structure where the number of layers for wiring is three and a one-column reversal driving method is employed. In FIG. 18, a portion where the source bus lines SL1 to SL6 of the first column to the sixth column are provided is focused on. In any of the first layer to the third layer, the number of the source bus lines SL where the polarity of video signals is positive is one, and the number of the source bus lines SL where the polarity of video signals is negative is one. In this manner, taking the six source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 19 is a schematic cross-sectional view illustrating one example (different from the example of FIG. 18) of the wiring structure where the number of layers for wiring is three and the one-column reversal driving method is employed. Similarly to the example shown in FIG. 18, taking the six source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 20 is a schematic cross-sectional view illustrating one example (different from the example of FIG. 18 and FIG. 19) of the wiring structure where the number of layers for wiring is three and the one-column reversal driving method is employed. Similarly to the example shown in FIG. 18, taking the six source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.7.2.2 Three-Layer and Two-Column Reversal Driving Method>

FIG. 21 is a schematic cross-sectional view illustrating one example of the wiring structure where the number of layers for wiring is three and a two-column reversal driving method is employed. In FIG. 21, a portion where the source bus lines SL1 to SL12 of the first column to the twelfth column are provided is focused on. In any of the first layer to the third layer, the number of the source bus lines SL where the polarity of video signals is positive is two, and the number of the source bus lines SL where the polarity of video signals is negative is two. In this manner, taking the twelve source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 22 is a schematic cross-sectional view illustrating one example (different from the example of FIG. 21) of the wiring structure where the number of layers for wiring is three and the two-column reversal driving method is employed. Similarly to the example shown in FIG. 21, taking the twelve source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 23 is a schematic cross-sectional view illustrating one example (different from the example of FIG. 21 and FIG. 22) of the wiring structure where the number of layers for wiring is three and the two-column reversal driving method is employed. Similarly to the example shown in FIG. 21, taking the twelve source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.7.2.3 Three-Layer and Three-Column Reversal Driving Method>

FIG. 24 is a schematic cross-sectional view illustrating one example of the wiring structure where the number of layers for wiring is three and a three-column reversal driving method is employed. In FIG. 24, a portion where the source bus lines SL1 to SL6 of the first column to the sixth column are provided is focused on. In any of the first layer to the third layer, the number of the source bus lines SL where the polarity of video signals is positive is one, and the number of the source bus lines SL where the polarity of video signals is negative is one. In this manner, taking the six source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 25 is a schematic cross-sectional view illustrating one example (different from the example of FIG. 24) of the wiring structure where the number of layers for wiring is three and the three-column reversal driving method is employed. Similarly to the example shown in FIG. 24, taking the six source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 26 is a schematic cross-sectional view illustrating one example (different from the example of FIG. 24 and FIG. 25) of the wiring structure where the number of layers for wiring is three and the three-column reversal driving method is employed. Similarly to the example shown in FIG. 24, taking the six source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.7.3 Four Layers>
<1.7.3.1 Four-Layer and One-Column Reversal Driving Method>

FIG. 27 is a schematic cross-sectional view illustrating one example of the wiring structure where the number of layers for wiring is four and a one-column reversal driving method is employed. In FIG. 27, a portion where the source bus lines SL1 to SL8 of the first column to the eighth column are provided is focused on. In any of the first layer to the fourth layer, the number of the source bus lines SL where the polarity of video signals is positive is one, and the number of the source bus lines SL where the polarity of video signals is negative is one. In this manner, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 28 is a schematic cross-sectional view illustrating one example (different from the example of FIG. 27) of the wiring structure where the number of layers for wiring is four and a one-column reversal driving method is employed. Similarly to the example shown in FIG. 27, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 29 is a schematic cross-sectional view illustrating one example (different from the example of FIG. 27 and FIG. 28) of the wiring structure where the number of layers for wiring is four and a one-column reversal driving method is employed. Similarly to the example shown in FIG. 27, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.7.3.2 Four-Layer and Two-Column Reversal Driving Method>

FIG. 30 is a schematic cross-sectional view illustrating one example of the wiring structure where the number of layers for wiring is four and a two-column reversal driving method is employed. In FIG. 30, a portion where the source bus lines SL1 to SL8 of the first column to the eighth column are provided is focused on. In any of the first layer to the fourth layer, the number of the source bus lines SL where the polarity of video signals is positive is one, and the number of the source bus lines SL where the polarity of video signals is negative is one. In this manner, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 31 is a schematic cross-sectional view illustrating one example (different from the example of FIG. 30) of the wiring structure where the number of layers for wiring is four and a two-column reversal driving method is employed. Similarly to the example shown in FIG. 30, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 32 is a schematic cross-sectional view illustrating one example (different from the example of FIG. 30 and FIG. 31) of the wiring structure where the number of layers for wiring is four and a two-column reversal driving method is employed. Similarly to the example shown in FIG. 30, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.7.3.3 Four-Layer and Three-Column Reversal Driving Method>

FIG. 33 is a schematic cross-sectional view illustrating one example of the wiring structure where the number of layers for wiring is four and a three-column reversal driving method is employed. In FIG. 33, a portion where the source bus lines SL1 to SL24 of the first column to the twenty-fourth column are provided is focused on. In any of the first layer to the fourth layer, the number of the source bus lines SL where the polarity of video signals is positive is three, and the number of the source bus lines SL where the polarity of video signals is negative is three. In this manner, taking the twenty-four source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 34 is a schematic cross-sectional view illustrating one example (different from the example of FIG. 33) of the wiring structure where the number of layers for wiring is four and a three-column reversal driving method is employed. Similarly to the example shown in FIG. 33, taking the twenty-four source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 35 is a schematic cross-sectional view illustrating one example (different from the example of FIG. 33 and FIG. 34) of the wiring structure where the number of layers for wiring is four and a three-column reversal driving method is employed. Similarly to the example shown in FIG. 33, taking the twenty-four source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.7.3.4 Four-Layer and Four-Column Reversal Driving Method>

FIG. 36 is a schematic cross-sectional view illustrating one example of the wiring structure where the number of layers for wiring is four and a four-column reversal driving method is employed. In FIG. 36, a portion where the source bus lines SL1 to SL8 of the first column to the eighth column are provided is focused on. In any of the first layer to the fourth layer, the number of the source bus lines SL where the polarity of video signals is positive is one, and the number of the source bus lines SL where the polarity of video signals is negative is one. In this manner, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 37 is a schematic cross-sectional view illustrating one example (different from the example of FIG. 36) of the wiring structure where the number of layers for wiring is four and a four-column reversal driving method is employed. Similarly to the example shown in FIG. 36, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

FIG. 38 is a schematic cross-sectional view illustrating one example (different from the example of FIG. 36 and FIG. 37) of the wiring structure where the number of layers for wiring is four and a four-column reversal driving method is employed. Similarly to the example shown in FIG. 36, taking the eight source bus lines SL as one group, the number of the columns whose polarity is positive is equal to the number of the columns whose polarity is negative in each layer. As described above, also in this variant, the polarities of the video signals are balanced in each layer of the layered region 50. Therefore, similarly to the first embodiment, deterioration of display quality due to difference in wiring resistance and capacitance between the layers is suppressed.

<1.8 Conclusion>

In the above description, various examples regarding the number of the layers of wiring and the unit of reversal in the column-reversal driving method are described. As a concept common to the above examples, the following concept can be derived. It should be noted that, in the following, P and Q are natural numbers. In a display device in which the number of the layers of wiring is P and a Q-column reversal driving method is employed where a polarity of a pixel voltage is reversed every Q columns in each frame (examples of the column-reversal driving method herein include both the column-reversal driving method and the dot-reversal driving method), the plurality of source bus lines SL are wired in the plurality of layers such that taking the source bus lines SL of a number equal to a double of a least common multiple of P and Q as one group, the number of the source bus lines SL to which positive video signals are applied is made equal to the number of the source bus lines SL to which negative video signals are applied in each of the layers of the layered region 50 in each horizontal scanning period. According to the display device that satisfies the above concept, the polarities of the video signals are balanced in each layer of the layered region 50 every unit of columns as few as possible. With this, occurrence of bias in polarities of the video signals in each layer is effectively suppressed, and deterioration of display quality is effectively suppressed.

2. Second Embodiment

Next, a second embodiment of the present invention will be described. Here, a description of a part similar with the first embodiment will be omitted. Regarding the polarity reversal method, the description is given assuming that the one-column reversal driving method is employed. However, a multi-column reversal driving method may be employed, or the dot-reversal driving method may be employed.

<2.1 Configuration>

Figure 39:
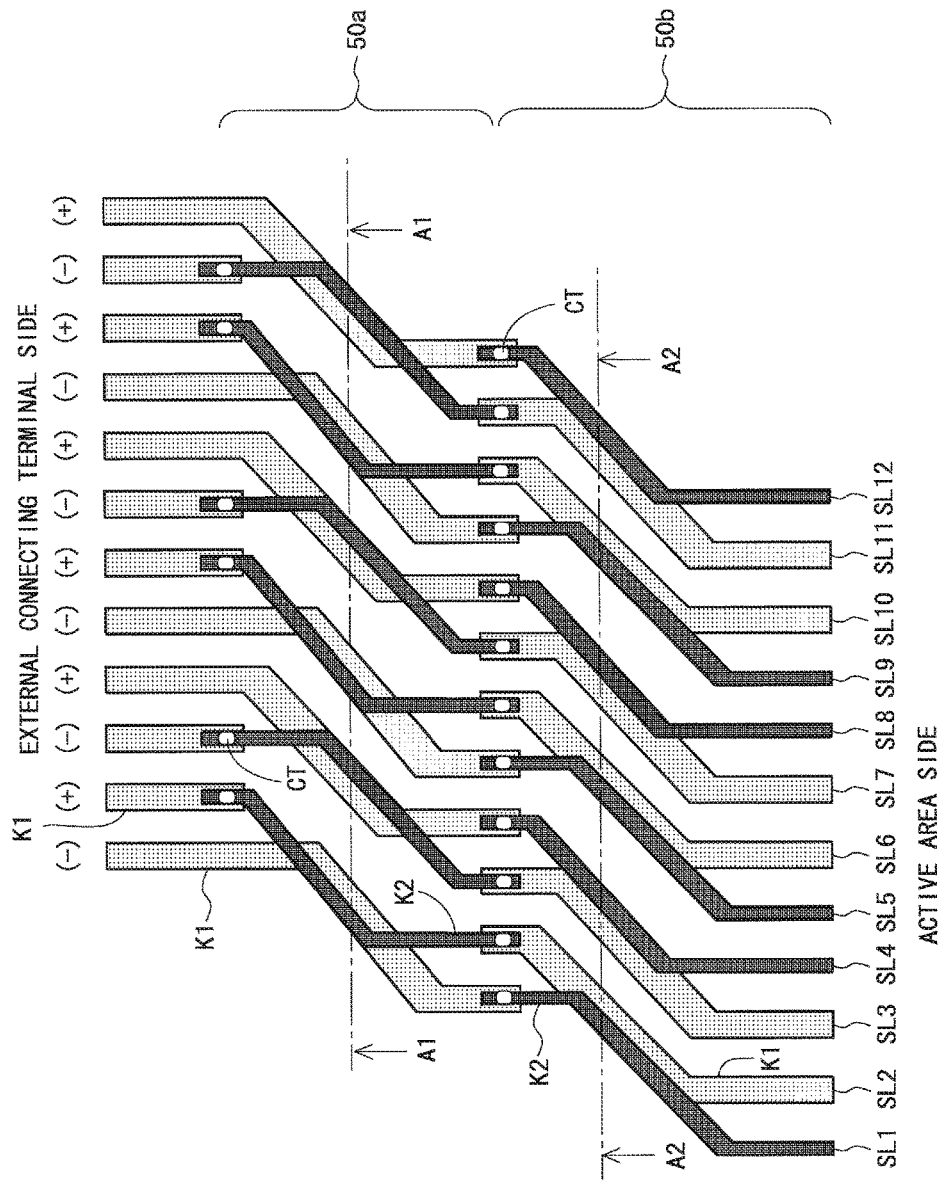
FIG. 39 is a plan view illustrating a wiring structure of a layered region in a liquid crystal display device according to a second embodiment of the present invention.

A description for an entire configuration will be omitted since the configuration is the same as that of the first embodiment (see FIG. 2). FIG. 39 is a plan view illustrating a wiring structure (a wiring structure between the external connecting terminals 15 and the active area 40) of the layered region 50 according to this embodiment. As illustrated in FIG. 39, the liquid crystal display device according to this embodiment is provided with two layered regions (a first layered region 50a and a second layered region 50b). A cross-sectional view of the first layered region 50a (a cross-sectional view taken along line A1-A1 in FIG. 39) is as shown in FIG. 8. A cross-sectional view of the second layered region 50b (a cross-sectional view taken along line A2-A2 in FIG. 39) is as shown in FIG. 40. As can be seen from FIG. 39, FIG. 8, and FIG. 40, the source bus lines SL provided in the first layer in the first layered region 50a are provided in the second layer in the second layered region 50b, and the source bus lines SL provided in the second layer in the first layered region 50a are provided in the first layer in the second layered region 50b.

In the first embodiment, the source bus lines SL of a half of an entire lines are configured only by the first-layer wiring lines K1, and the remaining half of the source bus lines SL are configured by the first-layer wiring lines K1 and the second-layer wiring lines K2. By contrast, in this embodiment, all of the source bus lines SL are configured by the first-layer wiring lines K1 and the second-layer wiring lines K2. It should be noted that, regarding all of the source bus lines SL, the first-layer wiring lines K1 and the second-layer wiring lines K2 are respectively connected by the contacts CT at a boundary portion between the first layered region 50*a* and the second layered region 50*b*.

<2.2 Balance of Polarities of Video Signals in Each Layer>

A diagram showing polarities of video signals respectively applied to the source bus lines SL of corresponding layers of the first layered region 50*a* in one frame (frame A) is as shown in FIG. 9. Further, a diagram showing polarities of video signals respectively applied to the source bus lines SL of corresponding layers of the second layered region 50*b* in the frame A is as shown in FIG. 41. A diagram showing polarities of video signals respectively applied to the source bus lines SL of corresponding layers of the first layered region 50*a* in a frame (frame B) following the frame A is as shown in FIG. 10. Moreover, a diagram showing polarities of video signals respectively applied to the source bus lines SL of corresponding layers of the second layered region 50*b* in the frame B is as shown in FIG. 42.

As described above, during a period in which the liquid crystal display device operates, in each layer of the first layered region 50*a* and the second layered region 50*b*, a number of the source bus lines SL to which positive video signals are applied is equal to a number of the source bus lines SL to which negative video signals are applied.

<2.3 Relationship Between Source Bus Lines and Different Lines>

Figure 43:
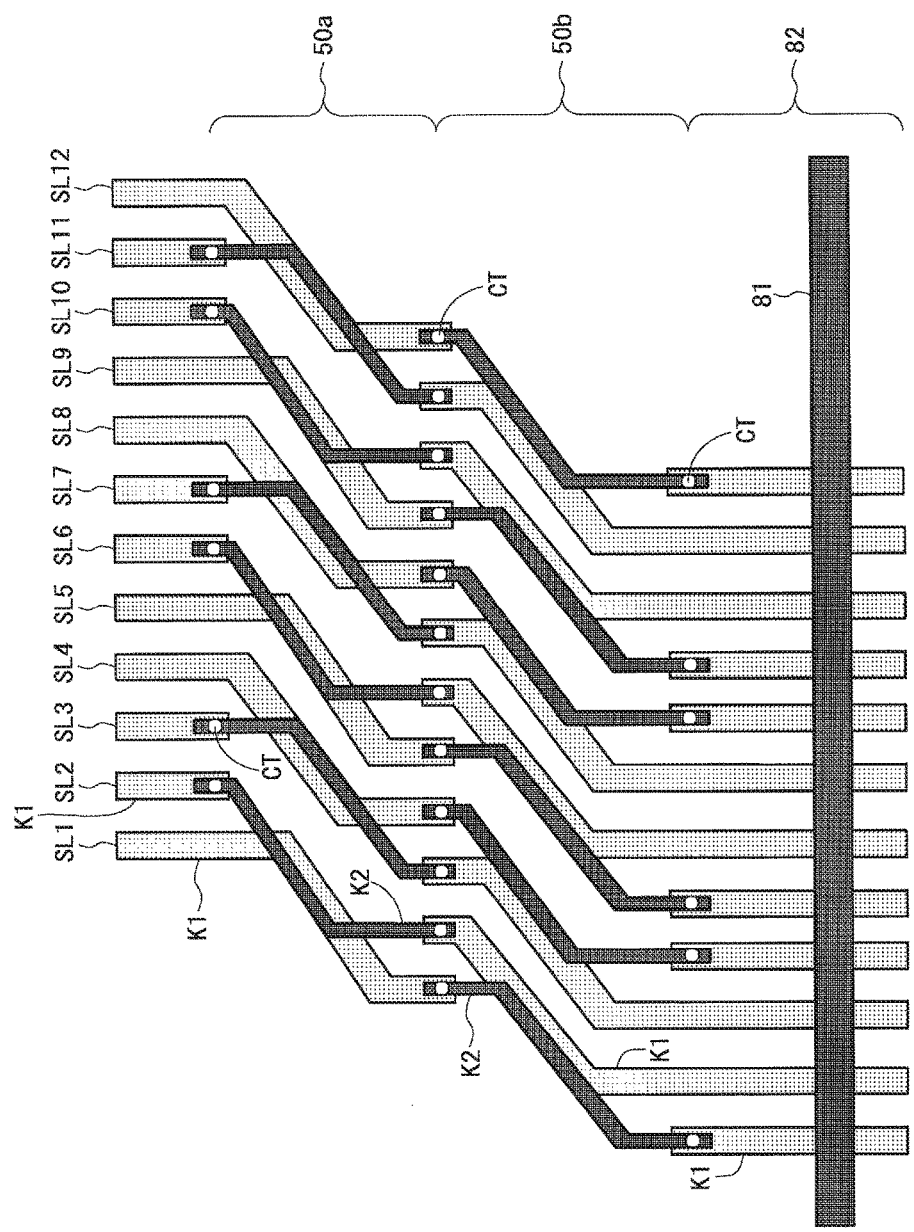
FIG. 43 is a diagram for illustration of wiring at a portion where the source bus lines intersect with a different line according to the second embodiment.
Figure 44:
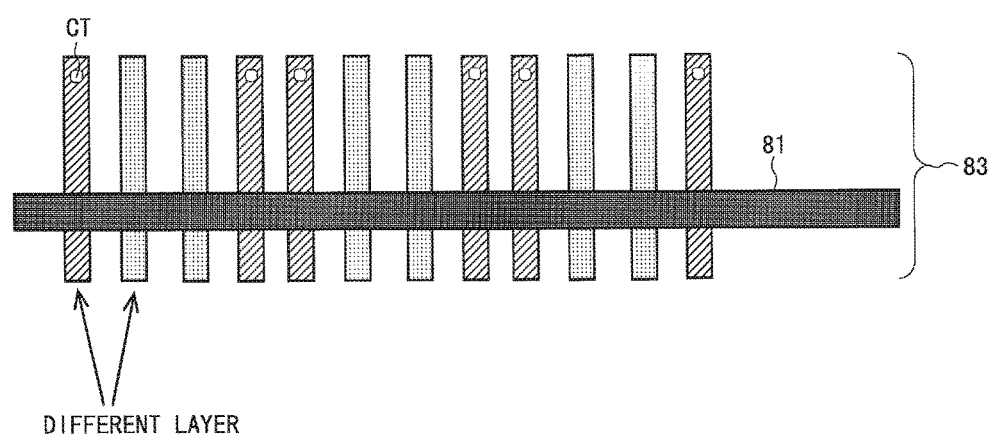
FIG. 44 is a diagram for illustration of wiring at the portion where the source bus lines intersect with a different line according to the second embodiment.

Here, the wiring at a portion where the source bus lines SL intersect with a different line (e.g., a power line) is be described. In a case in which the source bus lines SL intersect with a different line 81 where a wiring structure as shown in FIG. 39, for example, is employed, it is desirable to make the source bus lines SL intersect with the different line 81 in a region in which all of the source bus lines SL are provided in the same layer like a region indicated by a reference character 82 in FIG. 43. If the source bus lines SL intersect with the different line 81 in a region in which the source bus lines SL are provided in a plurality of layers like a region indicated by a reference character 83 in FIG. 44, a wiring resistance varies depending on the layer, and therefore waveforms of the video signals are rounded in different manners between different layers. In this respect, when the configuration as shown in FIG. 43 is employed, bias in magnitude of the wiring resistance does not occur in the portion where the source bus lines SL intersect with the different line 81. Therefore, waveforms of the video signals are rounded in the same manner in all of the source bus lines SL. With this, deterioration of display quality is more effectively suppressed. It should be noted that the description here is given taking the example in which there are two layered regions as shown in FIG. 39, this also applies to the case in which there is only one layered region as shown in FIG. 1.

<2.4 Effects>

Figure 57:
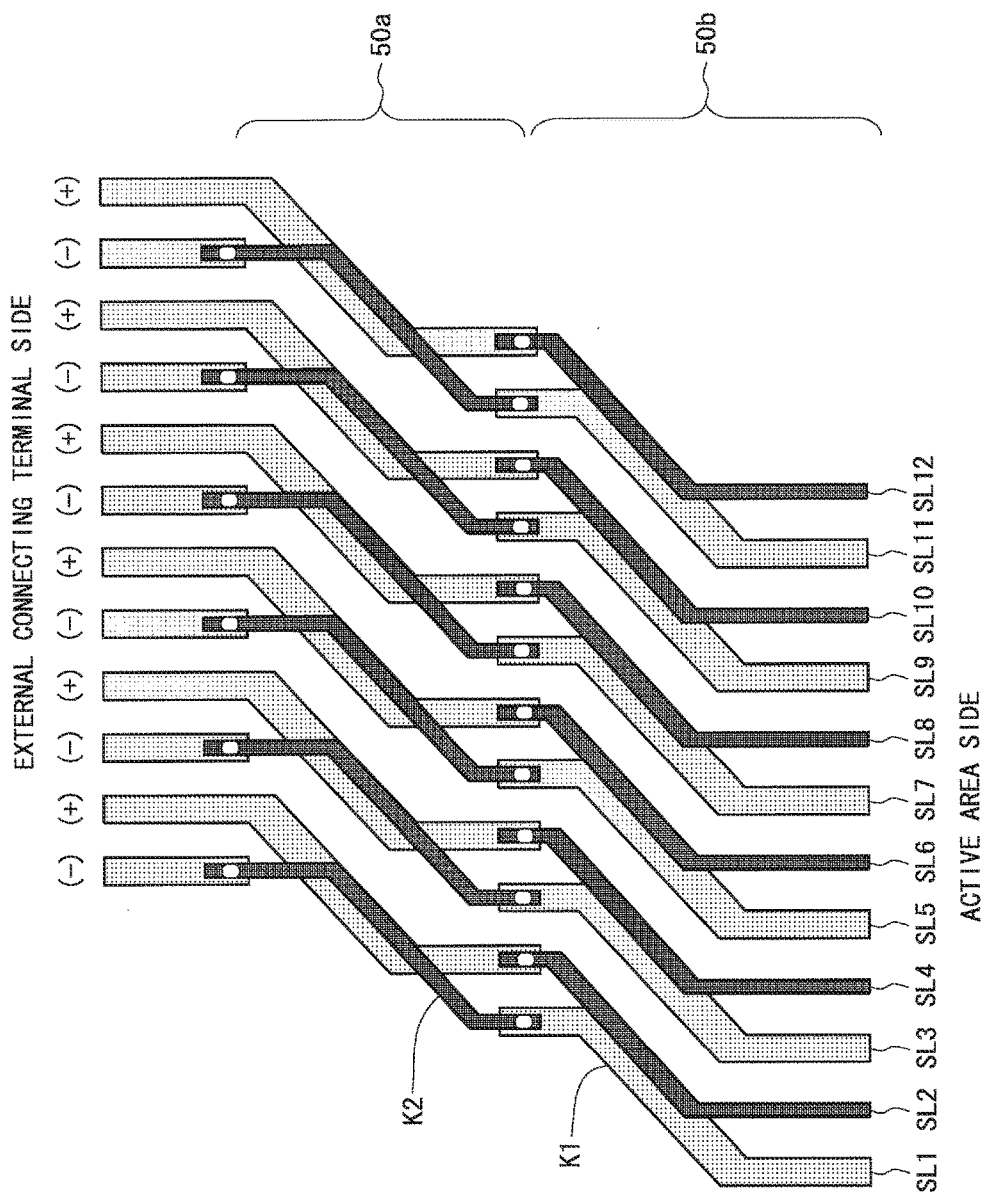
FIG. 57 is a diagram illustrating a conventional wiring structure having two layered regions.

Before describing effects of this embodiment, a case in which there are two layered regions in the conventional example will be described. FIG. 57 is a diagram illustrating a conventional wiring structure having two layered regions (the first layered region 50*a* and the second layered region 50*b*). According to the configuration illustrated in FIG. 57, in one frame (frame A), in the first layered region 50*a*, the polarities of the video signals applied to the respective source bus lines SL provided in the first layer are all positive, and the polarities of the video signals applied to the respective source bus lines SL provided in the second layer are all negative. In the frame A, in the second layered region 50*b*, the polarities of the video signals applied to the respective source bus lines SL provided in the first layer are all negative, and the polarities of the video signals applied to the respective source bus lines SL provided in the second layer are all positive. It is considered that by providing two layered regions in this manner, bias in polarities of the video signals in the first layered region 50*a* and bias in polarities of the video signals in the second layered region 50*b* are canceled each other.

Figure 58:
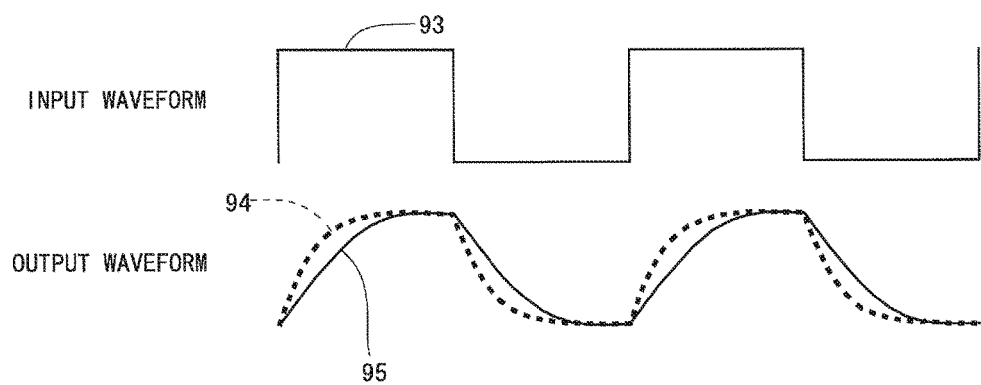
FIG. 58 is a diagram for illustration of rounding of a waveform of video signals.

However, in practice, with the configuration (conventional configuration) shown in FIG. 57, deterioration of display quality due to bias in polarities of the video signals may not be eliminated. This is because of the following reasons. For example, when there is an input waveform as indicated by a reference character 93 in FIG. 58 regarding the video signals, an output waveform as indicated by a reference character 94 in FIG. 58 (waveform with small delay) is obtained in the source bus lines SL with a small capacitance (wiring capacitance), and an output waveform as indicated by a reference character 95 in FIG. 58 (waveform with large delay) is obtained in the source bus lines SL with a large capacitance (wiring capacitance). As seen above, the difference in the capacitance influences on how waveforms of the video signals are rounded. Further, also in the case in which a layered wiring structure is employed, even when a resistance value is constant over each of the source bus lines SL as a whole, the larger the capacitance at a part distant from the external connecting terminal is, the larger a delay in the waveform of the video signal becomes. In the meantime, according to the configuration illustrated in FIG. 57, all of the source bus lines SL (the source bus lines SL of the odd-numbered columns) to which negative video signals are applied in one frame (frame A) are provided in the second layer in the first layered region 50*a*, and provided in the first layer in the second layered region 50*b*. Further, all of the source bus lines SL (the source bus lines SL of the even-numbered column) to which positive video signals are applied in the frame A are provided in the first layer in the first layered region 50*a*, and provided in the second layer in the second layered region 50*b*. Due to such a configuration, ultimately, rounding of the waveforms of the video signals in the source bus lines SL of the odd-numbered columns becomes different from rounding of the waveforms of the video signals in the source bus lines SL of the even-numbered column. Therefore, deterioration of display quality cannot be eliminated.

In this respect, according to this embodiment, regarding the source bus lines SL (the source bus lines SL of the odd-numbered columns) to which negative video signals are applied in one frame (frame A), the number of the source bus lines SL provided in the first layer in the first layered region 50*a* and provided in the second layer in the second layered region 50*b* is equal to the number of the source bus lines SL provided in the second layer in the first layered region 50*a* and provided in the first layer in the second layered region 50*b*. Similarly, regarding the source bus lines SL (the source bus lines SL of the even-numbered columns) to which positive video signals are applied in the frame A, the number of the source bus lines SL provided in the first layer in the first layered region 50*a* and provided in the second layer in the second layered region 50*b* is equal to the number of the source bus lines SL provided in the second layer in the first layered region 50*a* and provided in the first layer in the second layered region 50*b*. Thus, waveforms of the video signals are rounded in the same manner both in the source bus lines SL of the odd-numbered columns and in the source bus lines SL of the even-numbered columns, as a whole. Therefore, according to this embodiment, deterioration of display quality is effectively suppressed. Further, by employing the configuration in which the source bus lines SL intersect with the different lines in a region in which all of the source bus lines SL are provided in the same layer, it is possible to suppress deterioration of display quality more effectively.

3. Third Embodiment

Next, a third embodiment of the present invention will be described. Note that, a region in which wiring is not layered (a region other than the layered region 50) is hereinafter referred to as a "non-layered region" for convenience sake.

<3.1 Configuration>

Figure 45:
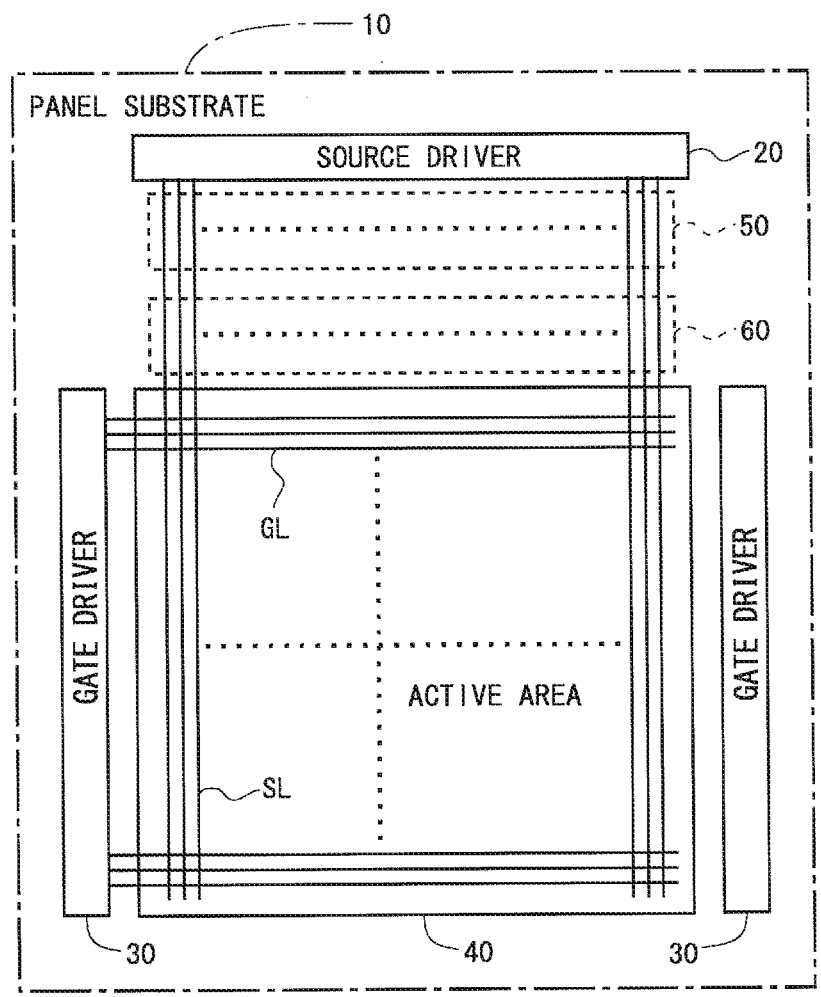
FIG. 45 is a block diagram illustrating an entire configuration of the liquid crystal display device according to a third embodiment of the present invention.

FIG. 45 is a block diagram illustrating an entire configuration of the active matrix-type liquid crystal display device according to this embodiment. The liquid crystal display device according to this embodiment is provided with a testing circuit 60, in addition to the components of the first embodiment. The testing circuit 60 is provided in a region between the active area 40 and the layered region 50. The testing circuit 60 examines whether or not there is leakage between adjacent source bus lines SL. The components other than the testing circuit 60 are the same as those of the first embodiment, and therefore a description for these components will be omitted. Here, it is assumed that the wiring structure of the layered region 50 is the same as that of the first embodiment (see FIG. 1 and FIG. 8).

Figure 46:
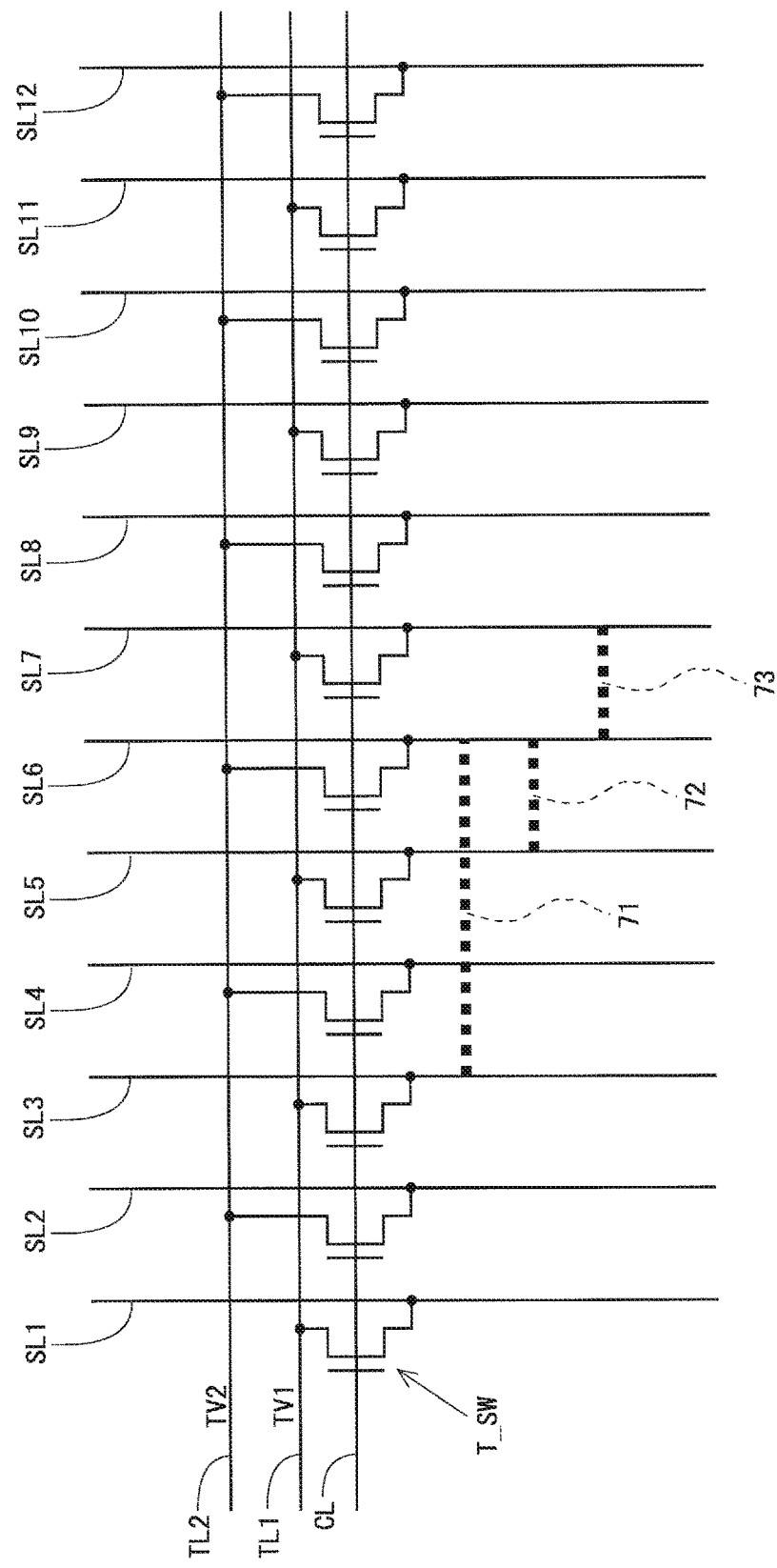
FIG. 46 is a circuit diagram illustrating a detailed configuration of a testing circuit according to the third embodiment.

FIG. 46 is a circuit diagram illustrating a detailed configuration of the testing circuit 60 according to this embodiment. The testing circuit 60 includes two testing lines (a first testing line TL1 and a second testing line TL2), a control line CL, and testing switches T_SW respectively provided for the source bus lines SL. To the first testing line TL1, a first potential TV1 is supplied. To the second testing line TL2, a second potential TV2 is supplied. Here, the magnitude of the first potential TV1 and the magnitude of the second potential TV2 are different. Each of the testing switches T_SW is configured by a TFT. Regarding the testing switch T_SW, a gate electrode is connected to the control line CL, a drain electrode is connected to either of the first testing line TL1 and the second testing line TL2, and a source electrode is connected to the source bus line SL. The control line CL is supplied with a control signal for turning the testing switches T_SW on when an examination is carried out. Here, in this embodiment, a first-type potential supply line is implemented by the first testing line TL1, and a second-type potential supply line is implemented by the second testing line TL2.

As illustrated in FIG. 46, in this embodiment, the drain electrodes of the testing switches T_SW provided respectively for the source bus lines SL of the odd-numbered columns are all connected to the first testing line TL1. Further, the drain electrodes of the testing switches T_SW provided respectively for the source bus lines SL of the even-numbered columns are all connected to the second testing line TL2.

<3.2 Examination Using Testing Circuit>

As described above, the testing circuit 60 examines whether or not there is leakage between the source bus lines SL. Regarding the liquid crystal display device having a layered wiring structure, there are the following three types of leakage (short circuit) between two source bus lines SL.

First type: leakage occurred between two adjacent source bus lines SL in a non-layered region.

Second type: leakage occurred between two adjacent source bus lines SL in the vertical direction in the layered region 50.

Third type: leakage occurred between two adjacent source bus lines SL in the horizontal direction in the layered region 50.

Figure 47:
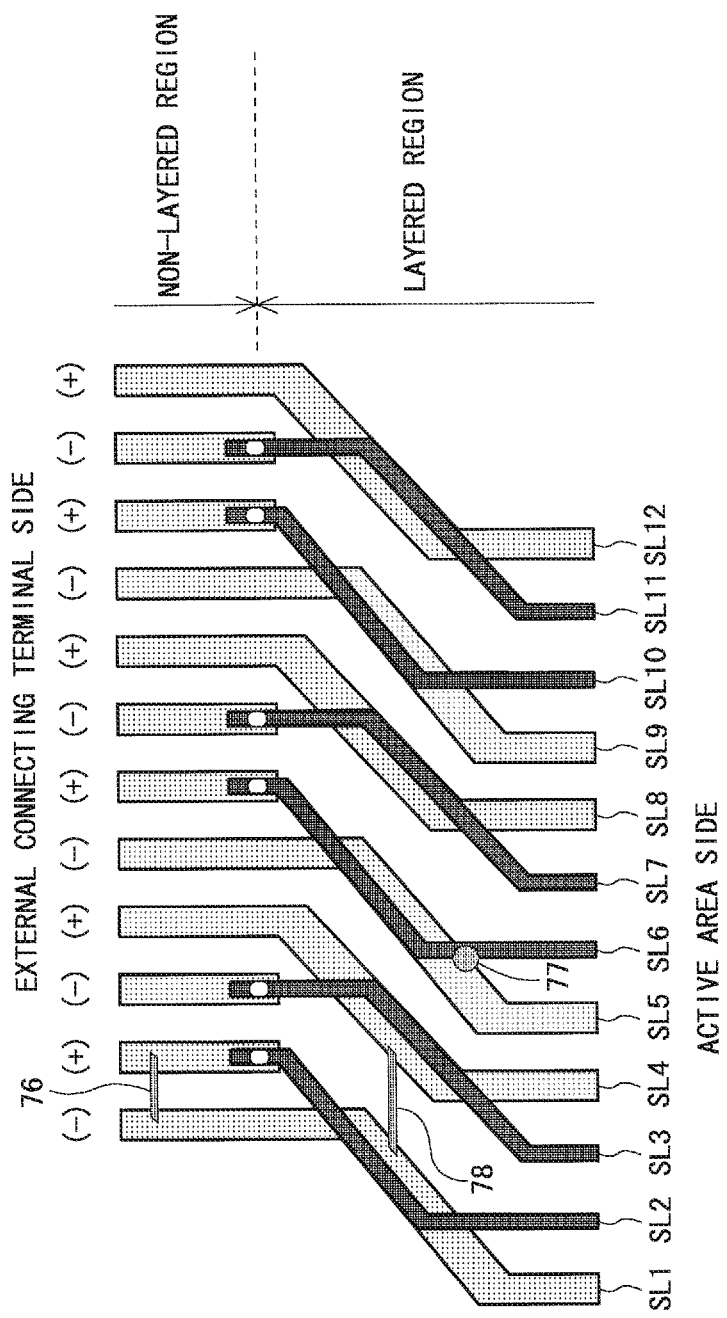
FIG. 47 is a diagram for description of leakage of a first type to a third type.

A portion indicated by a reference character 76 in FIG. 47 schematically shows leakage of the first type, a portion indicated by a reference character 77 in FIG. 47 schematically shows leakage of the second type, and a portion indicated by a reference character 78 in FIG. 47 schematically shows leakage of the third type.

Here, the source bus line SL6 of the sixth column is focused on. Examples of leakage occurred between the source bus line SL6 of the sixth column and another source bus lines SL (leakage of the first type to the third type) include the following.

First type: leakage between the source bus line SL6 of the sixth column and the source bus line SL5 of the fifth column, and leakage between the source bus line SL6 of the sixth column and the source bus line SL7 of the seventh column.

Second type: leakage between the source bus line SL6 of the sixth column and the source bus line SL5 of the fifth column (see FIG. 8).

Third type: leakage between the source bus line SL6 of the sixth column and the source bus line SL3 of the third column, and leakage between the source bus line SL6 of the sixth column and the source bus line SL7 of the seventh column (see FIG. 8).

In the meantime, in order to examine whether or not there is leakage between two source bus lines SL, it is necessary to supply testing potentials of different magnitudes respectively to the two source bus lines SL. In the examples above, it is necessary to supply the source bus line SL6 of the sixth column with a testing potential whose magnitude is different from that of testing potentials supplied to the source bus lines SL3, SL5, and SL7 of the third column, the fifth column, and the seventh column. In this regard, as can be seen from FIG. 46, the second potential TV2 is supplied as a testing potential to the source bus line SL6 of the sixth column, and the first potential TV1 is supplied as a testing potential to the source bus lines SL3, SL5, and SL7 of the third column, the fifth column, and the seventh column. Therefore, it is possible to detect leakage between the source bus line SL6 of the sixth column and the source bus line SL3 of the third column (see a heavy dashed line indicated by a reference character 71 in FIG. 46), leakage between the source bus line SL6 of the sixth column and the source bus line SL5 of the fifth column (see a heavy dashed line indicated by a reference character 72 in FIG. 46), and leakage between the source bus line SL6 of the sixth column and the source bus line SL7 of the seventh column (see a heavy dashed line indicated by a reference character 73 in FIG. 46). Specifically, leakage of any of the first type, the second type, and the third type can be detected.

<3.3 Effects>

Figure 54:
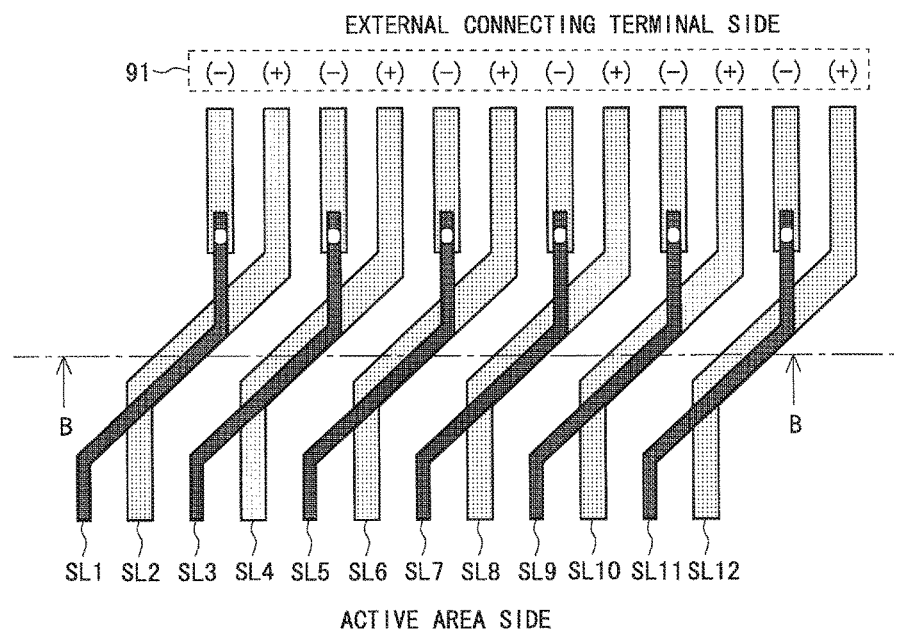
FIG. 54 is a plan view illustrating one example of a conventional layered wiring structure.
Figures 55, 56:
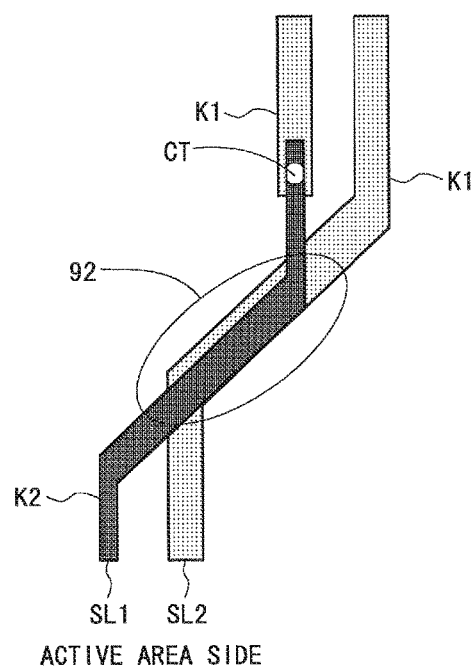
FIG. 55 is a diagram for detailed description of the wiring structure shown in FIG. 54.
FIG. 56 is a cross-sectional view (schematic view) taken along line B-B in FIG. 54.
Figure 59:
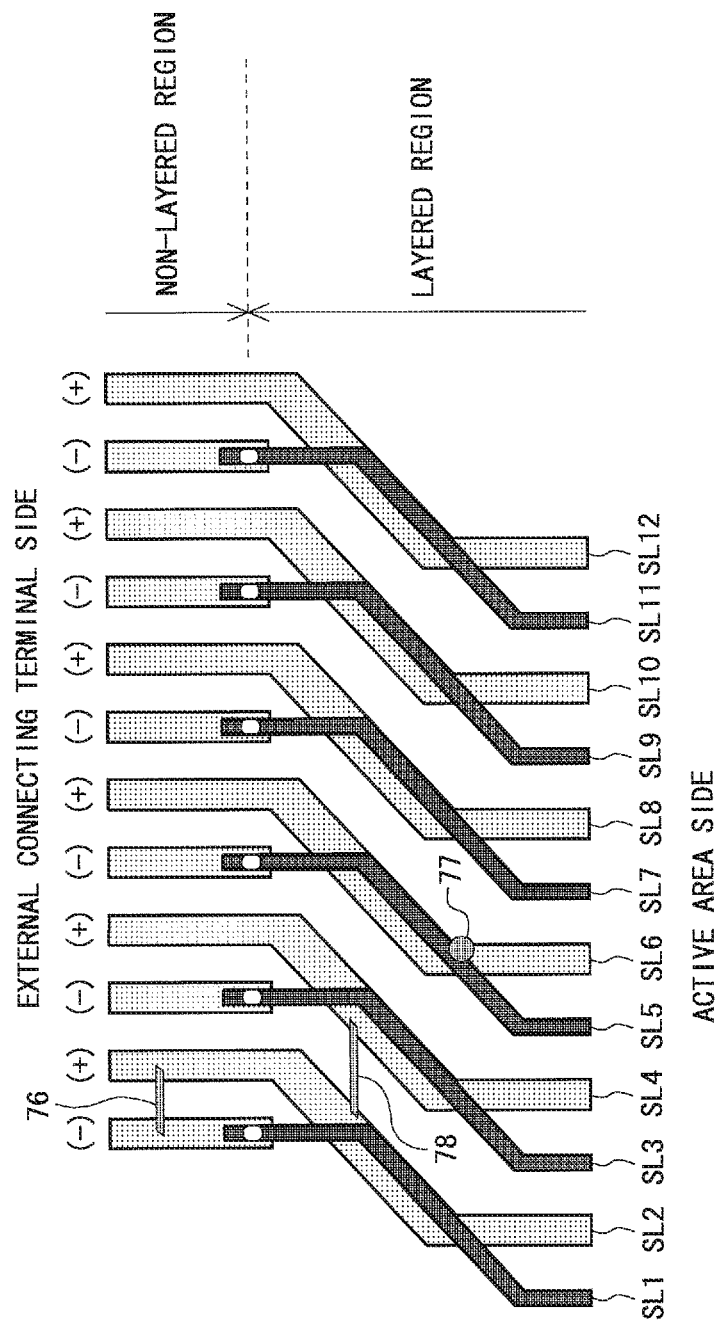
FIG. 59 is a diagram for description of leakage of a first type to a third type.

Before describing effects of this embodiment, the conventional example will be described. The testing circuit 60 according to this embodiment includes the two testing lines (the first testing line TL1 and the second testing line TL2) (see FIG. 46). Thus, a consideration is given on provision of a testing circuit having two testing lines for a liquid crystal display device having a conventional layered wiring structure illustrated in FIG. 54. Here, regarding the conventional layered wiring structure, a portion indicated by a reference character 76 in FIG. 59 schematically shows leakage of the first type, a portion indicated by a reference character 77 in FIG. 59 schematically shows leakage of the second type, and a portion indicated by a reference character 78 in FIG. 59 schematically shows leakage of the third type. A cross-sectional view (schematic view) along line B-B in FIG. 54 is as shown in FIG. 56.

Figure 60:
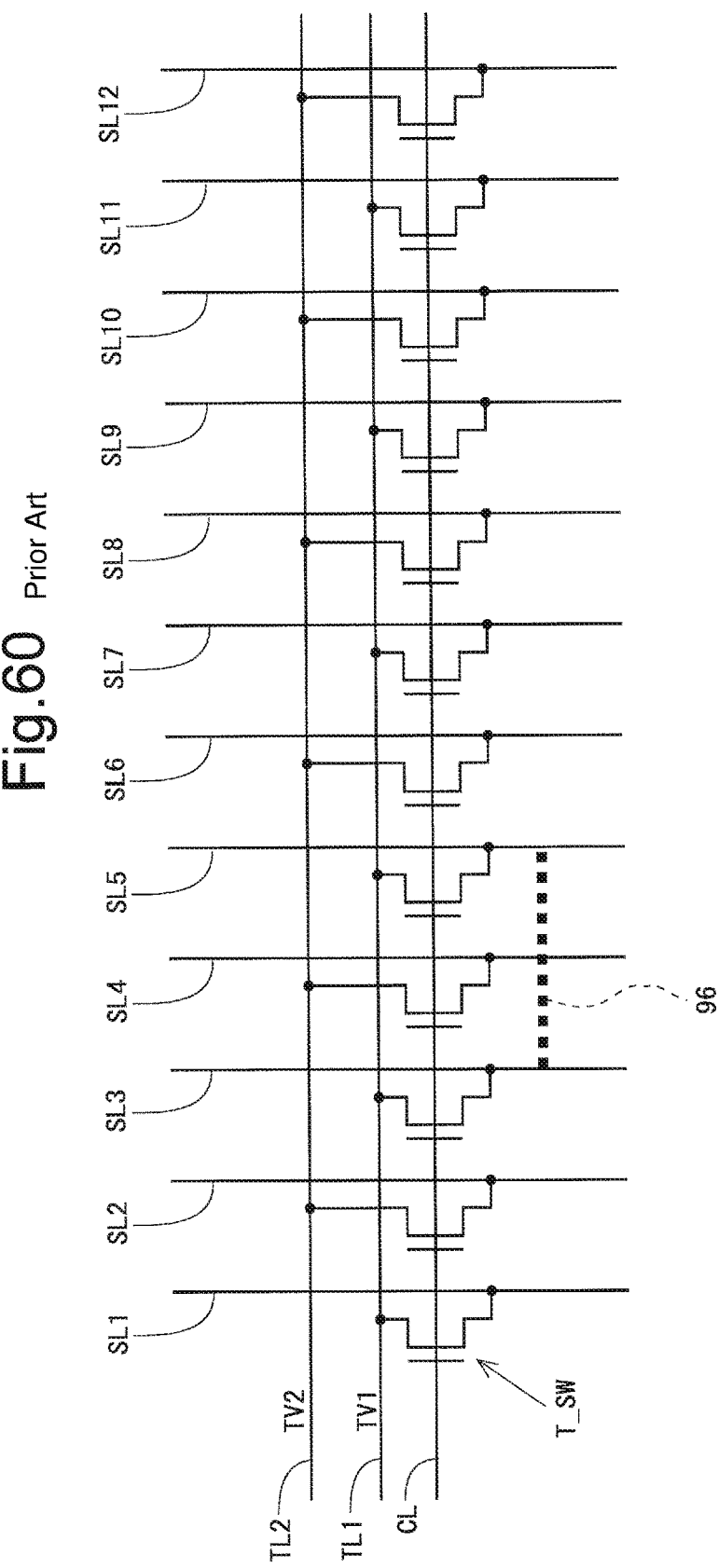
FIG. 60 is a diagram for illustration of a case in which a liquid crystal display device having the conventional layered wiring structure is provided with a testing circuit having two testing lines.

First, it is conceivable to employ a configuration as illustrated in FIG. 60 as a configuration of the testing circuit. In this configuration, the first potential TV1 is supplied as a testing potential to the source bus lines SL of the odd-numbered columns, and the second potential TV2 is supplied as a testing potential to the source bus lines SL of the even-numbered columns. According to this configuration, it is possible to detect leakage of the first type and leakage of the second type. However, it is not possible to detect leakage of the third type. For example, while the source bus line SL3 of the third column and the source bus line SL5 of the fifth column are adjacent in the second layer (see FIG. 56), testing potentials of the same magnitude are supplied to the source bus line SL3 of the third column and the source bus line SL5 of the fifth column as can be seen from FIG. 60. Therefore, it is not possible to detect leakage of the third type, such as leakage between the source bus line SL3 of the third column and the source bus line SL5 of the fifth column (see a heavy dashed line indicated by a reference character 96 in FIG. 60).

Figure 61:
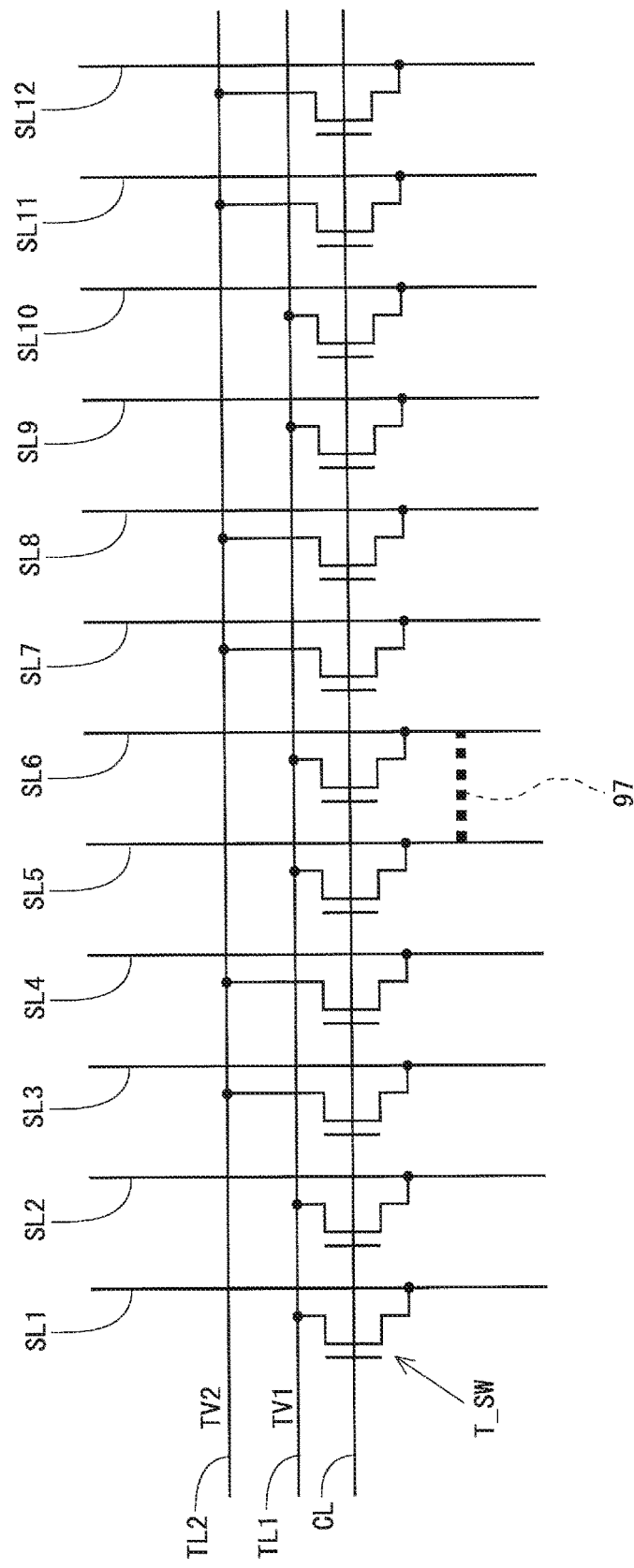
FIG. 61 is a diagram for illustration of a case in which a liquid crystal display device having the conventional layered wiring structure is provided with a testing circuit having two testing lines.

Further, it is conceivable to employ a configuration as illustrated in FIG. 61 as a configuration of the testing circuit. In this configuration, where n is an natural number, the first potential TV1 is supplied as a testing potential to the source bus lines SL of the (4n−3)th columns and the source bus lines SL of the (4n−2)th columns, and the second potential TV2 is supplied as a testing potential to the source bus lines SL of the (4n−1)th columns and the source bus lines SL of the 4n-th columns. According to this configuration, it is possible to detect leakage of the third type. However, it is not necessarily possible to detect leakage of the first type, and it is not possible to detect leakage of the second type. For example, while the source bus line SL5 of the fifth column and the source bus line SL6 of the sixth column are adjacent in the vertical direction in the layered region 50 (see FIG. 56), testing potentials of the same magnitude are supplied to the source bus line SL5 of the fifth column and the source bus line SL6 of the sixth column as can be seen from FIG. 61. Therefore, it is not possible to detect leakage of the second type, such as leakage between the source bus line SL5 of the fifth column and the source bus line SL6 of the sixth column (see a heavy dashed line indicated by a reference character 97 in FIG. 61).

Figure 62:
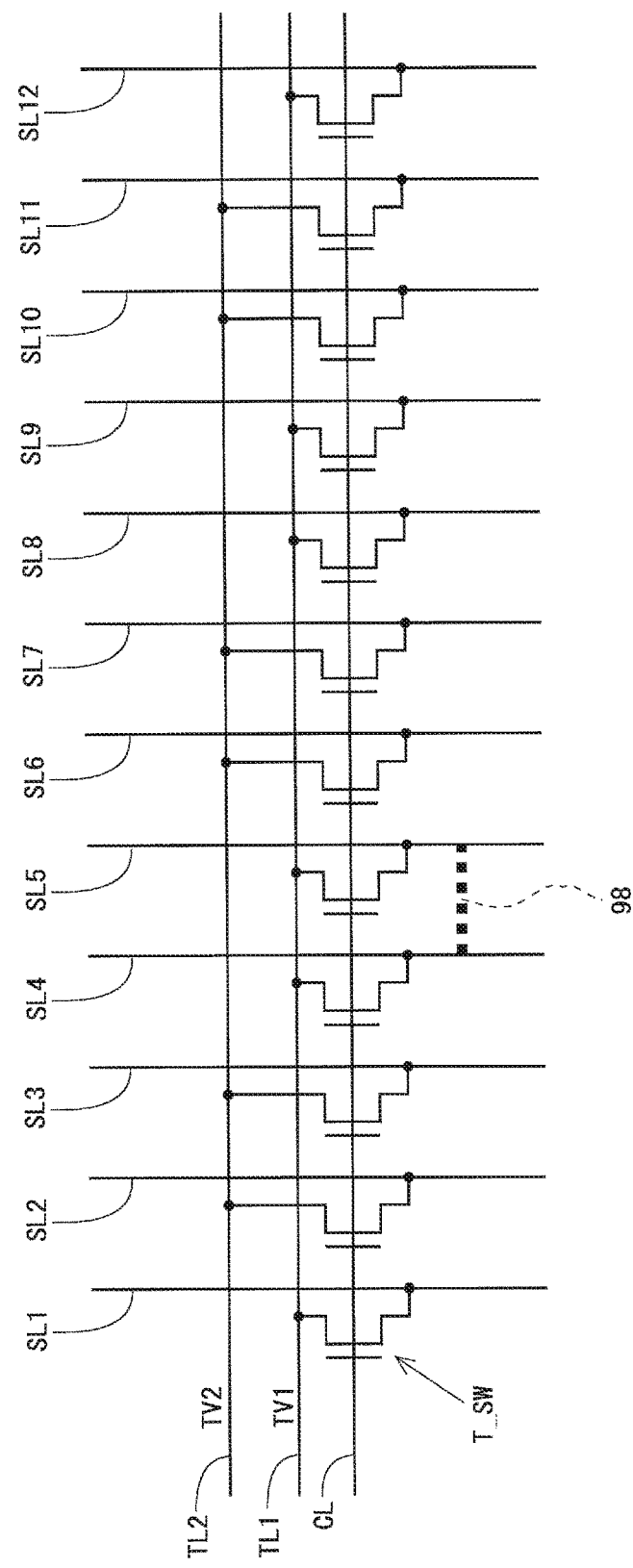
FIG. 62 is a diagram for illustration of a case in which a liquid crystal display device having the conventional layered wiring structure is provided with a testing circuit having two testing lines.

Further, it is conceivable to employ a configuration as illustrated in FIG. 62 as a configuration of the testing circuit. In this configuration, where n is an natural number, the first potential TV1 is supplied as a testing potential to the source bus lines SL of the (4n−3)th columns and the source bus lines SL of the 4n-th columns, and the second potential TV2 is supplied as a testing potential to the source bus lines SL of the (4n−2)th columns and the source bus lines SL of the (4n−1)th columns. According to this configuration, it is possible to detect leakage of the second type and leakage of the third type. However, it is not necessarily possible to detect leakage of the first type. For example, while source bus line SL4 of the fourth column and the source bus line SL5 of the fifth column are adjacent in the non-layered region (see FIG. 59), testing potentials of the same magnitude are supplied to the source bus line SL4 of the fourth column and the source bus line SL5 of the fifth column as can be seen from FIG. 62. Therefore, it is not necessarily possible to detect leakage of the first type, such as leakage between the source bus line SL4 of the fourth column and the source bus line SL5 of the fifth column (see a heavy dashed line indicated by a reference character 98 in FIG. 62).

As described above, with the conventional configuration, even when a testing circuit having only two testing lines is provided, it is not always possible to detect leakage of any of the patterns (the first to third patterns) described above.

In this regard, according to this embodiment, as can be seen from FIG. 8, two source bus lines SL adjacent in the vertical direction in the layered region 50 are a combination of a source bus line SL of an odd-numbered column and a source bus line SL of an even-numbered column, and two source bus lines SL adjacent in the horizontal direction in the layered region 50 are a combination of a source bus line SL of an odd-numbered column and a source bus line SL of an even-numbered column. Because such a wiring structure is employed, by supplying testing potentials of different magnitudes to the source bus lines SL of the odd-numbered columns and the source bus lines SL of the even-numbered columns using the two testing lines as illustrated in FIG. 46, the testing potentials of different magnitudes are supplied to any two adjacent source bus lines SL in the non-layered region, the testing potentials of different magnitudes are supplied to any two source bus lines SL adjacent in the vertical direction in the layered region 50, and the testing potentials of different magnitudes are supplied to any two source bus lines SL adjacent in the horizontal direction in the layered region 50.

As described above, it is possible to detect leakage of any of patterns (the first to third patterns) described above without fail by using the testing circuit 60 having only two testing lines. Since the testing circuit 60 may only include two testing lines in this manner, the testing circuit 60 can have a configuration simpler than the conventional configuration. With this, since a picture-frame size can be reduced, it is possible to downsize the display device.

<3.4 Regarding Circuit Illustrated in FIG. 46>

In the meantime, the circuit having the configuration illustrated in FIG. 46 is often used as a circuit (hereinafter referred to as a "charge elimination circuit") for eliminating electric charges from the source bus lines SL and the pixel formation portions 4 when a device is turned off or terminated abnormally. In a case in which the circuit having the configuration illustrated in FIG. 46 is used as a charge elimination circuit, when electric charges are eliminated, the switches T_SW are turned on in a state in which the first potential TV1 and the second potential TV2 are set to a ground potential (reference potential). With this, electric charges are quickly eliminated from the source bus lines SL and the pixel formation portions 4. Here, at this time, the two testing lines illustrated in FIG. 46 (the first testing line TL1 and the second testing line TL2) serve as reference potential lines. The present invention may be applied to the case in which the circuit having the configuration illustrated in FIG. 46 is used as such a charge elimination circuit. In this case, in the display device having a layered wiring structure, not only deterioration of display quality due to difference in wiring resistance and capacitance between the layers is suppressed, but also deterioration of display quality due to presence of residual electric charges is suppressed.

<3.5 Variants>

Hereinafter, different variants according to the third embodiment will be described.

<3.5.1 First Variants>

Although the example in which the number of the layers of wiring is two is described in the third embodiment, the present invention is not limited to such an example. The present invention may also be applied to a case in which the number of the layers of wiring is three or more.

For example, the wiring structure illustrated in FIG. 18 as an example in which the number of the layer of wiring is three is focused on. Here, a consideration is given on provision of the testing circuit 60 having a configuration illustrated in FIG. 46 for a liquid crystal display device having a wiring structure as illustrated in FIG. 18. According to the testing circuit 60 having the configuration illustrated in FIG. 46, testing potentials of different magnitudes are supplied respectively to the source bus lines SL of the odd-numbered columns and the source bus lines SL of the even-numbered columns. Then, as can be seen from FIG. 18, testing potentials of different magnitudes are supplied respectively to any two source bus lines SL adjacent in the vertical direction in the layered region 50, and testing potentials of different magnitudes are also supplied respectively to any two source bus lines SL adjacent in the horizontal direction in the layered region 50. Further, testing potentials of different magnitudes are also supplied respectively to any two adjacent source bus lines SL in the non-layered region. Thus, even when the number of layers of wiring is three, it is possible to detect leakage of any of patterns (the first to third patterns) described above without fail by using the testing circuit 60 having only two testing lines.

Further, for example, the wiring structure illustrated in FIG. 27 as an example in which the number of the layer of wiring is four is focused on. Here, a consideration is given on provision of the testing circuit 60 having a configuration illustrated in FIG. 46 for a liquid crystal display device having a wiring structure as illustrated in FIG. 27. According to the testing circuit 60 having the configuration illustrated in FIG. 46, testing potentials of different magnitudes are supplied respectively to the source bus lines SL of the odd-numbered columns and the source bus lines SL of the even-numbered columns. Then, as can be seen from FIG. 27, testing potentials of different magnitudes are supplied respectively to any two source bus lines SL adjacent in the vertical direction in the layered region 50, and testing potentials of different magnitudes are also supplied respectively to any two source bus lines SL adjacent in the horizontal direction in the layered region 50. Further, testing potentials of different magnitudes are also supplied respectively to any two adjacent source bus lines SL in the non-layered region. Thus, even when the number of layers of wiring is four, it is possible to detect leakage of any of patterns (the first to third patterns) described above without fail by using the testing circuit 60 having only two testing lines.

It should be noted that, as long as any two source bus lines SL adjacent in the vertical direction in the layered region 50 are a combination of a source bus line SL of an odd-numbered column and a source bus line SL of an even-numbered column and any two source bus lines SL adjacent in the horizontal direction are a combination of a source bus line SL of an odd-numbered column and a source bus line SL of an even-numbered column, it is possible to detect leakage of any of patterns (the first to third patterns) described above without fail by using the testing circuit 60 having only two testing lines, also in a liquid crystal display device having a wiring structure other than the example described above.

<3.5.2 Second Variant>

Although the testing circuit 60 includes only two testing lines in the third embodiment, the present invention is not limited to such an example, and the testing circuit 60 may include three or more testing lines.

Figure 48:
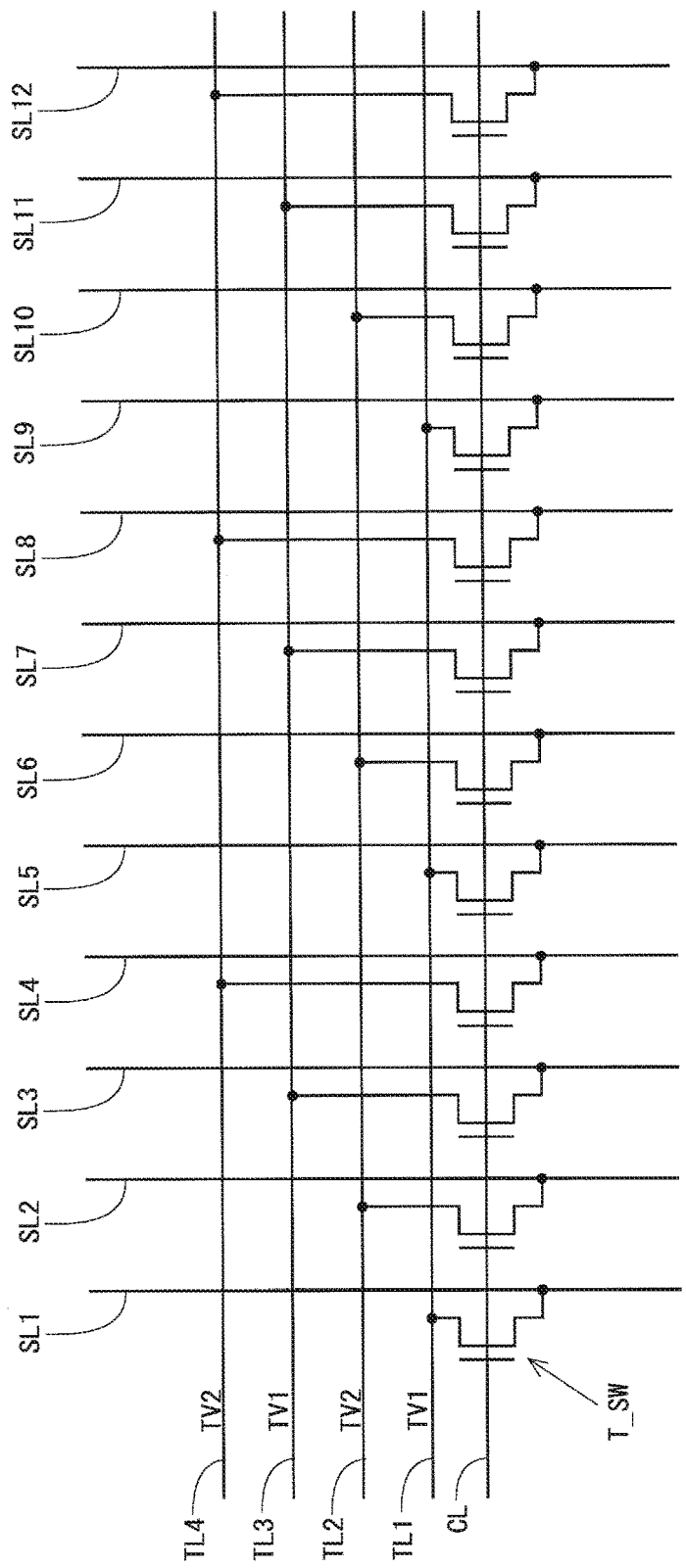
FIG. 48 is a circuit diagram illustrating a detailed configuration of the testing circuit according to a second variant of the third embodiment.

For example, as a configuration of the testing circuit 60 having four testing lines (first to fourth testing lines TL1 to TL4), a configuration as illustrated in FIG. 48 may be employed. In the configuration illustrated in FIG. 48, where n is an natural number, a testing potential is supplied from the first testing line TL1 to the source bus lines SL of the (4n−3)th columns, a testing potential is supplied from the second testing line TL2 to the source bus lines SL of the (4n−2)th columns, a testing potential is supplied from the third testing line TL3 to the source bus lines SL of the (4n−1)th columns, and a testing potential is supplied from the fourth testing line TL4 to the source bus lines SL of the 4n-th columns. In such a configuration, the first potential TV1 is supplied as a testing potential to the first testing line TL1 and the third testing line TL3, and the second potential TV2 is supplied as a testing potential to the second testing line TL2 and the fourth testing line TL4. Therefore, similarly to the third embodiment, testing potentials of different magnitudes are supplied respectively to the source bus lines SL of the odd-numbered columns and the source bus lines SL of the even-numbered columns. As described above, the number of the testing lines included in the testing circuit 60 may be three or more.

It should be noted that in this variant, the first-type potential supply line is implemented by the first testing line TL1 and the third testing line TL3, and the second-type potential supply line is implemented by the second testing line TL2 and the fourth testing line TL4.

<3.5.3 Third Variant>

Figure 49:
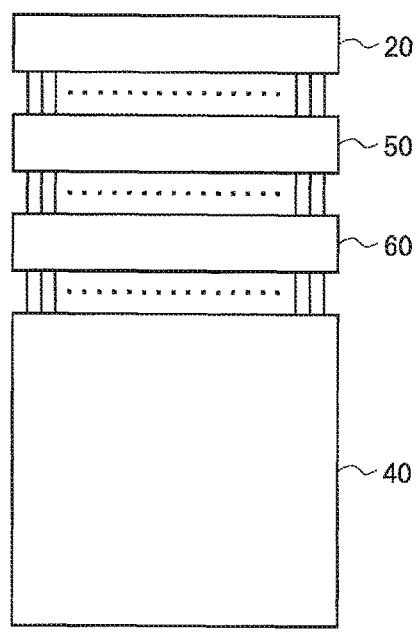
FIG. 49 is a diagram for illustration of a position of the testing circuit according to the third embodiment.
Figure 50:
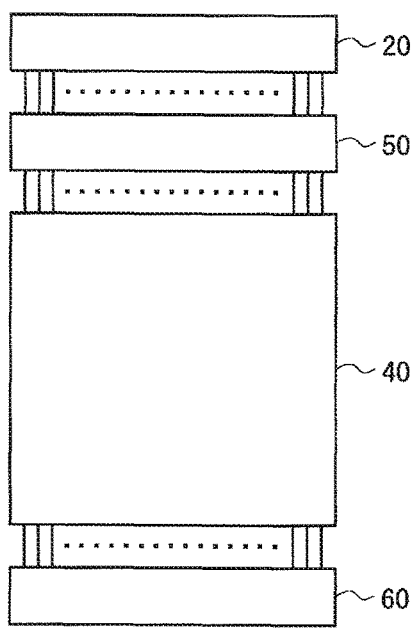
FIG. 50 is a diagram for illustration of a position of the testing circuit according to a third variant of the third embodiment.
Figure 51:
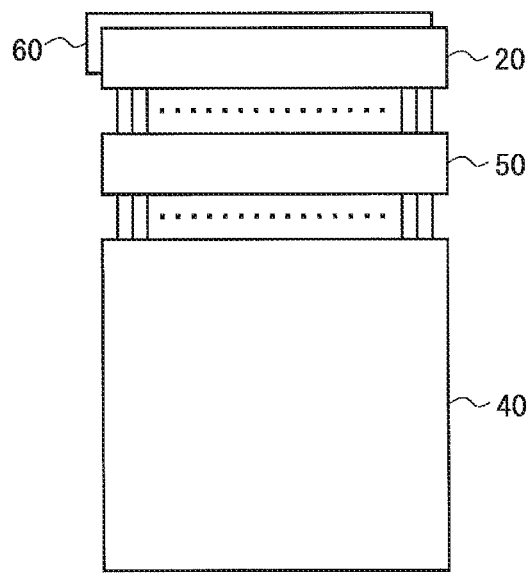
FIG. 51 is a diagram for illustration of a position of the testing circuit according to the third variant of the third embodiment.

In the third embodiment, the testing circuit 60 is provided in the region between the layered region 50 and the active area 40 (see FIG. 49). However, a position at which the testing circuit 60 is provided is not particularly limited. As illustrated in FIG. 50, for example, it is possible to employ a configuration in which the testing circuit 60 is provided in a region on an opposite side of the layered region 50 with respect to the active area 40. Further, as illustrated in FIG. 51, for example, it is possible to employ a configuration in which the testing circuit 60 is disposed under the source driver 20 (IC chip).

<3.5.4 Fourth Variant>

Conventionally, as a method of supplying video signals to source bus lines, there is known a driving method called SSD (Source Shared Driving) for distributing one video signal output that is outputted from a source driver to a plurality of source bus lines within an active area. According to SSD, for example, a video signal output from the source driver is distributed to a source bus line connected to pixel formation portions for red, a source bus line connected to pixel formation portions for green, and a source bus line connected to pixel formation portions for blue. The present invention may also be applied to the case in which SSD is employed as a driving method.

Figure 52:
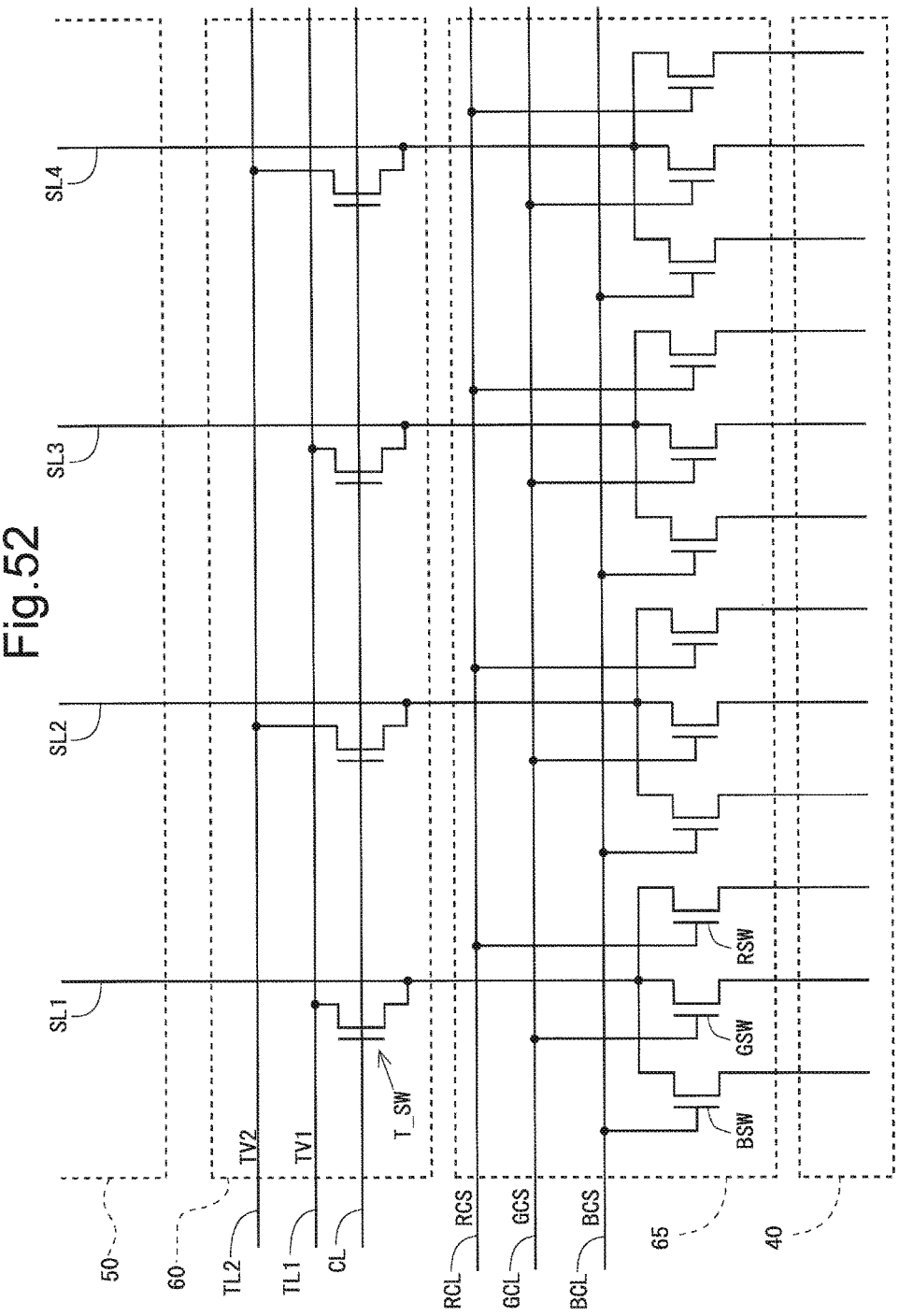
FIG. 52 is a diagram illustrating a configuration between a layered region and an active area according to a fourth variant of the third embodiment.
Figure 53:
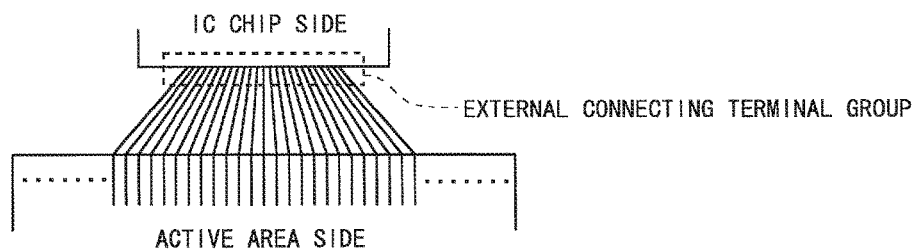
FIG. 53 is a diagram illustrating a wiring structure in a fan shape between an active area and external connecting terminals according to the conventional technique.

FIG. 52 is a diagram illustrating a configuration between the layered region 50 and the active area 40 according to this variant. Between the layered region 50 and the active area 40, the testing circuit 60 and an SSD circuit 65 are provided. The testing circuit 60 is provided between the layered region 50 and the SSD circuit 65. However, the position of the testing circuit 60 is not limited to this example.

The SSD circuit 65 includes, a control line for red RCL for transmitting a control signal for red RCS, a control line for green GCL for transmitting a control signal for green GCS, a control line for blue BCL for transmitting a control signal for blue BCS, a switch for red RSW controlled by the control signal for red RCS, a switch for green GSW controlled by the control signal for green GCS, and a switch for blue BSW controlled by the control signal for blue BCS. In such a configuration, one of the switch for red RSW, the switch for green GSW, and the switch for blue BSW is switched to an on state in each of horizontal scanning periods. Then, by switching the switch to be turned on, a video signal output from the source driver is distributed to the source bus line connected to the pixel formation portions for red, the source bus line connected to the pixel formation portions for green, and the source bus line connected to the pixel formation portions for blue.

In a case where the SSD circuit 65 described above is provided, similarly to the third embodiment, it is possible to detect leakage of any of patterns (the first to third patterns) described above without fail by using the testing circuit 60 having only two testing lines.

It should be noted that, although the example in which only one video signal output is distributed to three source bus lines is described here, the present invention may also be applied to a case in which SSD for distributing one video signal output to source bus lines of a number other than three is employed. It is also possible to apply the present invention to a case in which a protection circuit and various testing circuits are provided.

4. Other

The present invention is not limited to the embodiments described above, and various modifications may be made without departing from the scope of the present invention. For example, although the description is given taking the liquid crystal display device as an example in the above embodiments, the present invention is not limited to such an example. The present invention may be applied to a display device other than the liquid crystal display device, such as an organic EL (Electro Luminescence) display device. Further, although the description is given taking the example in which the column-reversal driving method is employed as the polarity reversal method in the above embodiments, the present invention is not limited to such an example. The present invention may be applied to a case in which the dot-reversal driving method is employed as the polarity reversal method.

DESCRIPTION OF REFERENCE CHARACTERS

4: PIXEL FORMATION PORTION
10: PANEL SUBSTRATE
15: EXTERNAL CONNECTING TERMINAL
20: SOURCE DRIVER
30: GATE DRIVER
40: ACTIVE AREA (DISPLAY REGION)
50: LAYERED REGION
50a: FIRST LAYERED REGION
50b: SECOND LAYERED REGION
60: TESTING CIRCUIT
CT: CONTACT
K1: FIRST-LAYER WIRING LINE
K2: SECOND-LAYER WIRING LINE
SL: SOURCE BUS LINE
TL1 to TL4: FIRST TO FOURTH TESTING LINES

The invention claimed is:

1. A display device comprising:
a panel substrate including a layered region and a display region, the layered region having a layered wiring structure of a plurality of layers;
a plurality of video signal lines provided on the panel substrate; and
a plurality of external connecting terminals, provided on the panel substrate, for receiving supply of video signals to be applied to the plurality of video signal lines, wherein
the plurality of video signal lines are provided so as to extend from the plurality of external connecting terminals into the display region via the layered region, and
the plurality of video signal lines are wired in the plurality of layers such that a number of video signal lines to which positive video signals are applied is substantially equal to a number of video signal lines to which negative video signals are applied in each of the layers in the layered region in each of horizontal scanning periods.

2. The display device according to claim 1, wherein
the panel substrate includes, as the layered region, a first layered region and a second layered region between the plurality of external connecting terminals and the display region, and
each of the plurality of video signal lines is wired in different layers in the first layered region and the second layered region.

3. The display device according to claim 1, wherein
the plurality of video signal lines and a different line intersect in a region in which the plurality of video signal lines are wired in the same layer.

4. The display device according to claim 1, wherein
in the layered region, wiring widths of the plurality of video signal lines are different between the layers.

5. The display device according to claim 1, wherein
the layered region has a layered wiring structure of P layers (where P is an integer equal to or greater than 2),
a Q-column reversal driving method in which a polarity of a video signal is reversed every Q video signal lines is employed (where Q is a natural number), and
taking video signal lines of a number equal to a double of a least common multiple of P and Q as one group, the number of video signal lines to which the positive video signals are applied matches the number of video signal lines to which the negative video signals are applied in each of the layers in the layered region in each of horizontal scanning periods.

6. The display device according to claim 5, further comprising:
a potential supply line configured to be able to supply a predetermined potential to each of the video signal lines.

7. The display device according to claim 6, wherein
in the layered region, two video signal lines adjacent in a vertical direction are a combination of a video signal line of an odd-numbered column and a video signal line of an even-numbered column, and two video signal lines adjacent in a horizontal direction are a combination of a video signal line of an odd-numbered column and a video signal line of an even-numbered column.

8. The display device according to claim 7, wherein
the potential supply line includes a first-type potential supply line connected to the video signal line of the odd-numbered column and a second-type potential supply line connected to the video signal line of the even-numbered column.

9. The display device according to claim 8, wherein the potential supply line includes a single first-type potential supply line and a single second-type potential supply line.

10. The display device according to claim 8, wherein potentials of different values are respectively supplied to the first-type potential supply line and the second-type potential supply line.

11. The display device according to claim 7, wherein the layered region has a layered wiring structure of two layers.

12. The display device according to claim 6, wherein a predetermined reference potential is supplied to the plurality of video signal lines via the potential supply line.

13. The display device according to claim 1, wherein the layered region has a layered wiring structure of two layers including a first layer and a second layer, the plurality of the video signal lines are arranged in columns, where n is a natural number, the video signal lines of (4n−3)th columns and the video signal lines of 4n-th columns of the plurality of video signal lines are wired in the first layer, and the video signal lines of (4n−2)th columns and the video signal lines of (4n−1)th columns of the plurality of video signal lines are wired in the second layer.

14. The display device according to claim 13, wherein the panel substrate includes, as the layered region, a first layered region and a second layered region between the plurality of external connecting terminals and the display region, the plurality of video signal lines that are wired in the first layer in the first layered region are wired in the second layer in the second layered region, and the plurality of video signal lines that are wired in the second layer in the first layered region are wired in the first layer in the second layered region.

* * * * *